US011865837B2

(12) United States Patent
Menzel et al.

(10) Patent No.: US 11,865,837 B2
(45) **Date of Patent: *Jan. 9, 2024**

(54) FLUID EJECTION DEVICES WITH REDUCED CROSSTALK

(71) Applicant: FUJIFILM Dimatix, Inc., Lebanon, NH (US)

(72) Inventors: Christoph Menzel, New London, NH (US); Kevin von Essen, San Jose, CA (US); Steven H. Barss, Wilmot Flat, NH (US); Mats G. Ottosson, Saltsjo-Boo (SE); Darren T. Imai, Los Gatos, CA (US)

(73) Assignee: FUJIFILM Dimatix, Inc., Lebanon, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/965,189

(22) Filed: Oct. 13, 2022

(65) Prior Publication Data

US 2023/0036902 A1 Feb. 2, 2023

Related U.S. Application Data

(60) Continuation of application No. 17/170,190, filed on Feb. 8, 2021, now Pat. No. 11,498,330, which is a (Continued)

(51) Int. Cl.

*B41J 2/055* (2006.01)
*B41J 2/14* (2006.01)

(Continued)

(52) U.S. Cl.

CPC ........... *B41J 2/055* (2013.01); *B41J 2/04525* (2013.01); *B41J 2/1433* (2013.01);

(Continued)

(58) Field of Classification Search

CPC .... B41J 2/055; B41J 2/04525; B41J 2/14233; B41J 2/1433; B41J 2/161; B41J 2/162;

(Continued)

(56) References Cited

U.S. PATENT DOCUMENTS 5,453,770 A * 9/1995 Katakura .................. B41J 2/19
347/85
6,003,971 A 12/1999 Hanks et al.

(Continued)

FOREIGN PATENT DOCUMENTS

CN 1666873 9/2005
CN 1890104 1/2007

(Continued)

OTHER PUBLICATIONS

EPO Communication pursuant to Article 94(3) EPC issued in European Application No. 16783614.7 dated Feb. 8, 2021, 8 pages.

(Continued)

*Primary Examiner* — Justin Seo
(74) *Attorney, Agent, or Firm* — Fish & Richardson P.C.

(57) ABSTRACT

A fluid ejection apparatus includes a plurality of fluid ejectors. Each fluid ejector includes a pumping chamber, and an actuator configured to cause fluid to be ejected from the pumping chamber. The fluid ejection apparatus includes a feed channel fluidically connected to each pumping chamber; and at least one compliant structure formed in a surface of the feed channel. The at least one compliant structure has a lower compliance than the surface of the feed channel.

10 Claims, 17 Drawing Sheets

Related U.S. Application Data continuation of application No. 16/013,835, filed on Jun. 20, 2018, now Pat. No. 10,913,264, which is a division of application No. 14/695,525, filed on Apr. 24, 2015, now Pat. No. 10,022,957.

(51) Int. Cl.
*B41J 2/16* (2006.01)
*B41J 2/045* (2006.01)

(52) U.S. Cl.
CPC .......... *B41J 2/14233* (2013.01); *B41J 2/161* (2013.01); *B41J 2/162* (2013.01); *B41J 2/164* (2013.01); *B41J 2/1623* (2013.01); *B41J 2/1628* (2013.01); *B41J 2/1629* (2013.01); *B41J 2/1631* (2013.01); *B41J 2/1632* (2013.01); *B41J 2002/14459* (2013.01); *B41J 2202/12* (2013.01)

(58) Field of Classification Search
CPC ...... B41J 2/1623; B41J 2/1628; B41J 2/1629; B41J 2/1631; B41J 2/1632; B41J 2/164; B41J 2002/14459; B41J 2202/12
See application file for complete search history.

(56) References Cited

U.S. PATENT DOCUMENTS

| | | | |
|---|---|---|---|
| 7,566,118 B2 | 7/2009 | Bibl et al. | |
| 8,523,321 B2 | 9/2013 | Ito | |
| 8,733,903 B2 | 5/2014 | Gao et al. | |
| 10,022,957 B2 | 7/2018 | Menzel et al. | |
| 2002/0196319 A1 | 12/2002 | Slenes et al. | |
| 2003/0001936 A1 | 1/2003 | Hirosawa et al. | |
| 2003/0202041 A1 * | 10/2003 | Murakami | B41J 2/1404 347/40 |
| 2005/0099467 A1 | 5/2005 | Bibl et al. | |
| 2006/0028519 A1 | 2/2006 | Nakamura et al. | |
| 2006/0181581 A1 | 8/2006 | Jung et al. | |
| 2009/0185005 A1 | 7/2009 | Sakai et al. | |
| 2009/0230088 A1 | 9/2009 | Bibl et al. | |
| 2010/0045740 A1 | 2/2010 | Andrews et al. | |
| 2010/0309252 A1 | 12/2010 | Silverbrook | |
| 2011/0085012 A1 | 4/2011 | Nishikawa et al. | |
| 2013/0002772 A1 | 1/2013 | Hiratsuka et al. | |
| 2014/0022308 A1 | 1/2014 | Gao et al. | |
| 2014/0232796 A1 | 8/2014 | Kimura et al. | |
| 2015/0042719 A1 | 2/2015 | Fukuzawa et al. | |
| 2015/0097897 A1 | 4/2015 | Redding et al. | |
| 2018/0297657 A1 | 10/2018 | Menzel et al. | |
| 2021/0154994 A1 | 5/2021 | Menzel et al. | |

FOREIGN PATENT DOCUMENTS

| | | |
|---|---|---|
| CN | 100548692 | 10/2009 |
| CN | 102848733 | 2/2013 |
| EP | 1552929 | 7/2005 |
| JP | 2003226010 | 8/2003 |
| JP | 2006224672 | 8/2006 |
| JP | 2008279690 | 11/2008 |
| JP | 2009196342 | 9/2009 |
| JP | 2009234096 | 10/2009 |
| JP | 2011025657 | 2/2011 |
| JP | 2012011653 | 1/2012 |
| JP | 2012011653 A * | 1/2012 |
| JP | 2015036245 | 2/2015 |
| JP | 2015074228 | 4/2015 |

OTHER PUBLICATIONS

EPO Communication pursuant to Article 94(3) EPC issued in European Application No. 16783614.7 dated Mar. 23, 2020, 6 pages.
Extended European Search Report in European Appln. No. 22169840.0, dated Aug. 19, 2022, 9 pages.
Notice of Allowance issued in Chinese Application No. 201680031786.0 dated May 31, 2019, 5 pages (with English translation).
Office Action in Japanese Appln. No. 2021-104762, dated May 25, 2022, 17 pages (with English Machine Translation).
Office Action issued in Chinese Application No. 201910743274.2 dated Jun. 3, 2020, 17 pages (with English translation).
Office Action issued in Japanese Application No. 2017-555323 dated Feb. 24, 2021, 9 pages (with English translation).
Office Action issued in Japanese Application No. 2017-555323 dated Mar. 3, 2020, 20 pages (with English translation).
PCT International Search Report and Written Opinion of the International Searching Authority, PCT/US16/27225, dated Jul. 15, 2016, 8 pages.
Supplementary European Search Report in European Application No. 16783614.7, dated Nov. 2, 2018, 9 pages.

* cited by examiner

FLUID EJECTION DEVICES WITH REDUCED CROSSTALK

CROSS-REFERENCE TO RELATED APPLICATION(S)

This application is a continuation of U.S. patent application Ser. No. 17/170,190, filed on Feb. 8, 2021, which is a continuation of and claims the benefit of priority to U.S. patent application Ser. No. 16/013,835, filed Jun. 20, 2018, now U.S. Pat. No. 10,913,264, issued Feb. 9, 2021, which is a divisional of and claims the benefit of priority to U.S. patent application Ser. No. 14/695,525, filed Apr. 24, 2015, now U.S. Pat. No. 10,022,957, issued Jul. 17, 2018. The contents of the prior applications are hereby incorporated by reference in their entirety.

TECHNICAL FIELD

The present disclosure relates generally to fluid ejection devices.

BACKGROUND

In some fluid ejection devices, fluid droplets are ejected from one or more nozzles onto a medium. The nozzles are fluidically connected to a fluid path that includes a fluid pumping chamber. The fluid pumping chamber can be actuated by an actuator, which causes ejection of a fluid droplet. The medium can be moved relative to the fluid ejection device. The ejection of a fluid droplet from a particular nozzle is timed with the movement of the medium to place a fluid droplet at a desired location on the medium. Ejecting fluid droplets of uniform size and speed and in the same direction enables uniform deposition of fluid droplets onto the medium.

SUMMARY

When an actuator of a fluid ejector is activated, a pressure fluctuation can propagate from the pumping chamber into the connected inlet and outlet feed channels. This pressure fluctuation can propagate into other fluid ejectors that are connected to the same inlet or outlet feed channel. This fluidic crosstalk can adversely affect the print quality.

To mitigate the propagation of pressure fluctuations, compliant microstructures can be formed in one or more surfaces of the inlet feed channel, the outlet feed channel, or both. The presence of compliant microstructures in a feed channel increases the compliance available in the surfaces of the feed channel, attenuating the pressure fluctuations that occur in that feed channel. In some examples, the compliant microstructures include recesses formed in a bottom surface of the feed channel. A membrane covers the recesses and deflects into the recesses responsive to an increase in pressure in the feed channel, thus attenuating the pressure fluctuation. In some examples, the compliant microstructures include nozzle-like structures formed in the bottom surface of the feed channel. When the pressure in the feed channel increases, a meniscus at an outward facing opening of each nozzle-like structure can attenuate the pressure fluctuation. The presence of such compliant microstructures can thus reduce fluidic crosstalk among fluid ejectors connected to the same inlet or outlet feed channel, thus stabilizing the drop size and velocity of the fluid ejected from each fluid ejectors and enabling precise and accurate printing.

In a general aspect, a fluid ejection apparatus includes a plurality of fluid ejectors. Each fluid ejector includes a pumping chamber, and an actuator configured to cause fluid to be ejected from the pumping chamber. The fluid ejection apparatus includes a feed channel fluidically connected to each pumping chamber; and at least one compliant structure formed in a surface of the feed channel. The at least one compliant structure has a lower compliance than the surface of the feed channel.

Embodiments can include one or more of the following features.

The at least one compliant structure comprises multiple recesses formed in the surface of the feed channel; and a membrane disposed over the recesses. In some cases, the membrane seals the recesses. In some cases, the depth of each recess is less than the thickness of the surface of the feed channel. In some cases, the membrane is configured to deflect into the recesses responsive to an increase in fluid pressure in the feed channel. In some cases, the recesses are formed in one or more of a bottom wall or a top wall of the feed channel. In some cases, the recesses are formed in a side wall of the feed channel.

The at least one compliant structure comprises one or more dummy nozzles formed in the surface of the feed channel. In some cases, each dummy nozzle includes a first opening on an internal surface of the surface and a second opening on an external surface of the surface. In some cases, a convex meniscus is formed at the second opening responsive to an increase in fluid pressure in the feed channel. In some cases, each fluid ejector includes a nozzle formed in a nozzle layer, and wherein the dummy nozzles are formed in the nozzle layer. In some cases, the dummy nozzles are substantially the same size as the nozzles.

Each fluid ejector includes a nozzle formed in a nozzle layer, and wherein the nozzle layer comprises the surface of the feed channel.

Each fluid ejector includes an actuator and a nozzle, and wherein actuation of one of the actuators causes fluid to be ejected from the corresponding nozzle. In some cases, actuation of one of the actuators causes a change in fluid pressure in the feed channel, and wherein the at least one compliant structure is configured to at least partially attenuate the change in fluid pressure in the feed channel.

In a general aspect, a method includes forming a plurality of nozzles in a nozzle layer; forming at least one compliant structure in the nozzle layer, wherein the at least one compliant structure has a lower compliance than the nozzle layer; and attaching the nozzle layer to a substrate comprising a plurality of fluid ejectors, each fluid ejector comprising a pumping chamber and an actuator configured to cause fluid to be ejected from the pumping chamber.

Embodiments can include one or more of the following features.

Forming at least one compliant structure in the nozzle layer comprises: forming a plurality of recesses in the nozzle layer; and disposing a membrane over the recesses. In some cases, disposing a membrane over the recesses comprises: depositing a membrane layer over a top surface of the nozzle layer; and removing a portion of the membrane layer over each nozzle.

Forming a plurality of nozzles comprises forming the plurality of nozzles in a first layer, and wherein forming at least one compliant structure comprises: forming the at least one compliant structure in a second layer; and attaching the first layer to the second layer.

Forming at least one compliant structure in the nozzle layer comprises: forming the at least one compliant structure in a first layer; and attaching the first layer to a second layer having the plurality of nozzles formed therein, wherein the first layer and the second layer together form the nozzle layer.

Forming at least one compliant structure in the nozzle layer comprises forming one or more dummy nozzles in the nozzle layer.

In a general aspect, a method includes actuating a fluid ejector in a fluid ejection apparatus. Actuation of the fluid ejector causes a change in fluid pressure in a feed channel fluidically connected to the fluid ejector. The method includes deflecting a membrane into a recess formed in a surface of the feed channel responsive to the change in fluid pressure in the feed channel.

Embodiments can include one or more of the following features.

Deflecting the membrane into the recess comprises reversibly deflecting the membrane.

The approaches described here can have one or more of the following advantages. The presence of compliant microstructures, such as recesses or dummy nozzles, in the surface of a feed channel can mitigate fluidic crosstalk among fluid ejectors fluidically connected to that feed channel. For instance, compliant microstructures can increase the compliance available in the surfaces of a feed channel, thus allowing the energy from a pressure fluctuation caused by the actuation of an actuator in a fluid ejector to be attenuated. As a result, the effect of the pressure fluctuation on other fluid ejectors connected to that feed channel can be reduced. By reducing fluidic crosstalk among fluid ejectors in a printhead, the drop size and velocity of the fluid ejected from the fluid ejectors can be stabilized, thus enabling precise and accurate printing.

The details of one or more embodiments are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
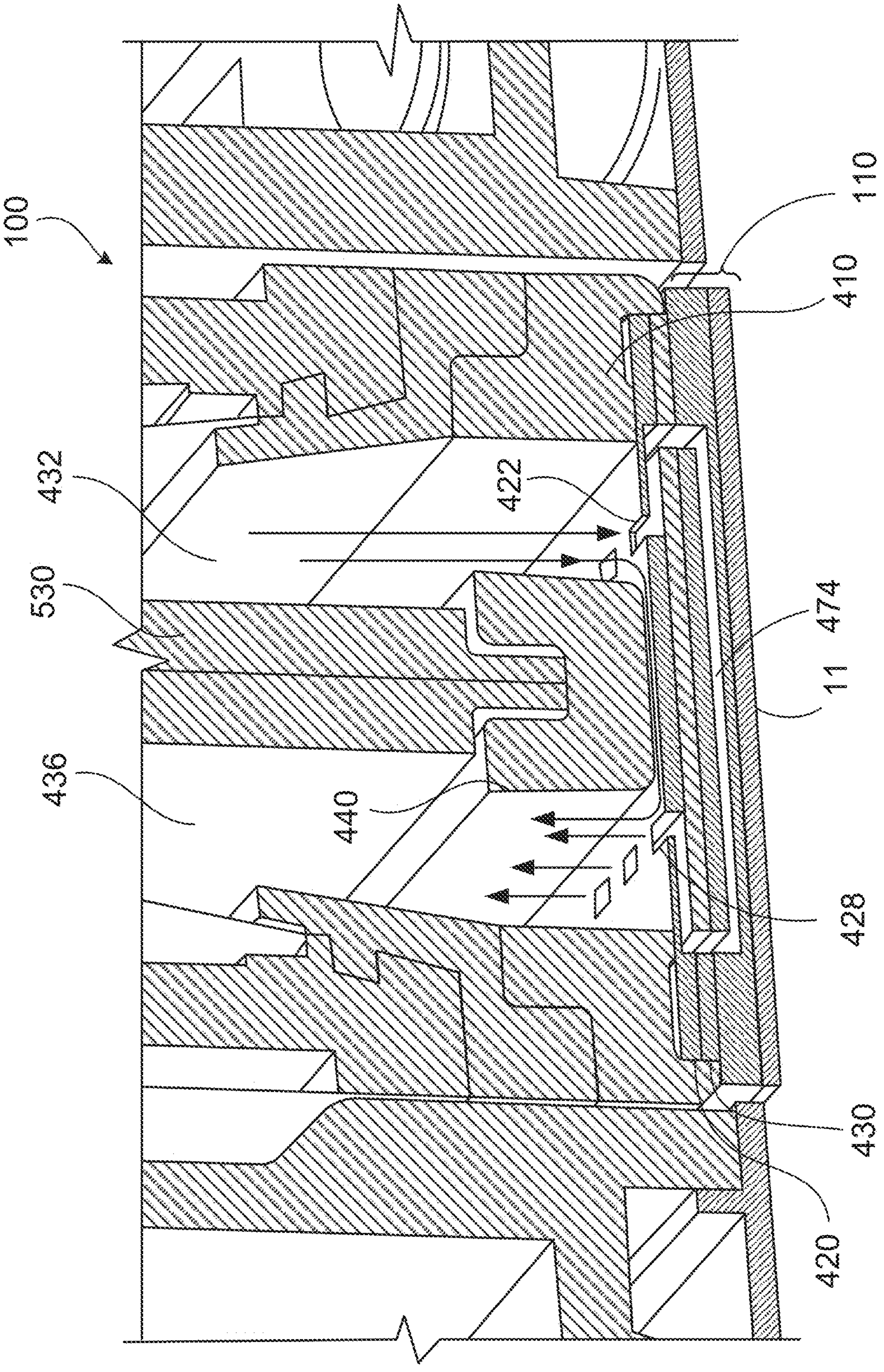
FIG. 1 is a cross sectional view of a printhead.

Referring to FIG. 1, a printhead 100 can be used for ejecting droplets of fluid, such as ink, biological liquids, polymers, liquids for forming electronic components, or other types of fluid, onto a surface. The printhead 100 includes a casing 410 with an interior volume that is divided into a fluid supply chamber 432 and a fluid return chamber 436, e.g., by an upper divider 530 and a lower divider 440.

The bottom of the fluid supply chamber 432 and the fluid return chamber 436 is defined by the top surface of an interposer assembly. The interposer assembly can be attached to a lower printhead casing 410, such as by bonding, friction, or another mechanism of attachment. The interposer assembly can include an upper interposer 420 and a lower interposer 430 positioned between the upper interposer 420 and a substrate 110.

The upper interposer 420 includes a fluid supply inlet 422 and a fluid return outlet 428. For instance, the fluid supply inlet 422 and fluid return outlet 428 can be formed as apertures in the upper interposer 420. A flow path 474 is formed in the upper interposer 420, the lower interposer 430, and the substrate 110. Fluid can flow along the flow path 474 from the supply chamber 432 into the fluid supply inlet 422 and to one or more fluid ejection devices (described in greater detail below) for ejection from the printhead 100. Fluid can also flow along the flow path 474 from one or more fluid ejection devices into the fluid return outlet 428 and into the return chamber 436. In FIG. 1, a single flow path 474 is shown as a straight passage for illustrative purposes; however, the printhead 100 can include multiple flow paths 474, and the flow paths 474 are not necessarily straight.

Figure 2:
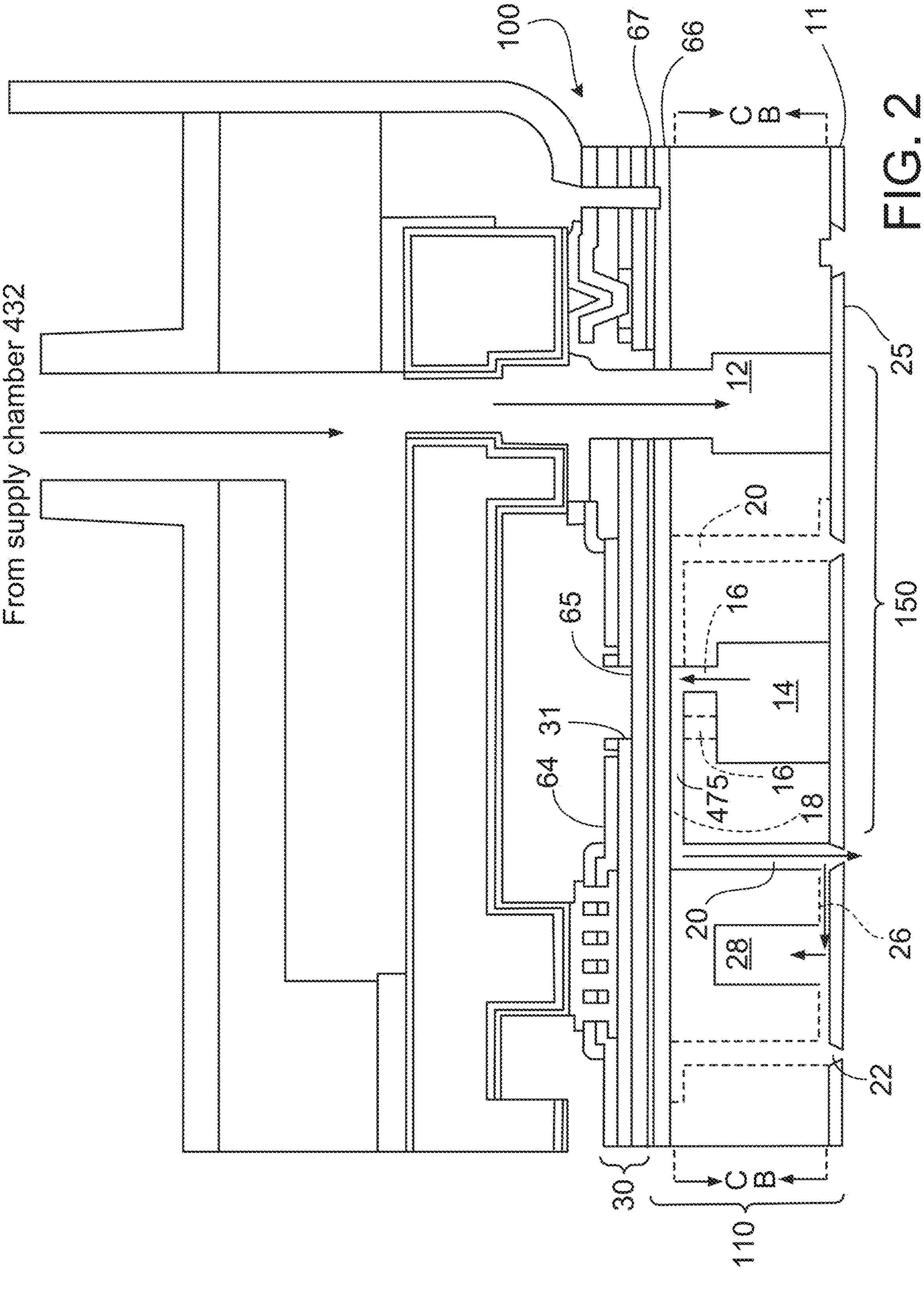
FIG. 2 is a cross sectional view of a portion of a printhead.
Figure 3:
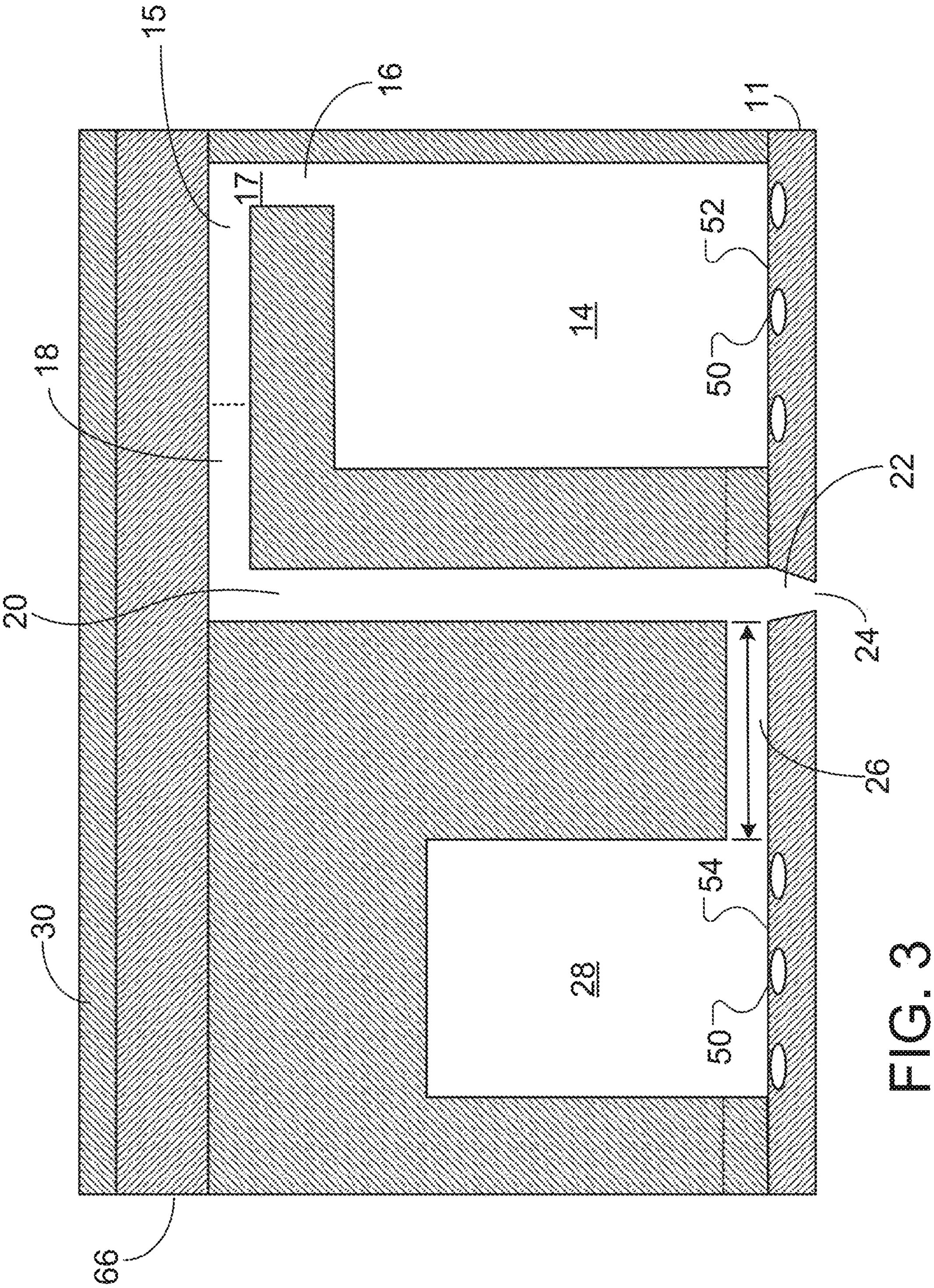
FIG. 3 is a cross sectional view of a fluid ejector.

Referring to FIGS. 2 and 3, the substrate 110 can be a monolithic semiconductor body, such as a silicon substrate. Passages through the substrate 110 define a flow path for fluid through the substrate 110. In particular, a substrate inlet 12 receives fluid from the supply chamber 432, extends through a membrane 66 (discussed in more detail below), and supplies fluid to one or more inlet feed channels 14. Each inlet feed channel 14 supplies fluid to multiple fluid ejectors 150 through a corresponding inlet passage (not shown). For simplicity, only one fluid ejector 150 is shown in FIGS. 2 and 3. Each fluid ejector includes a nozzle 22 formed in a nozzle layer 11 that is disposed on a bottom surface of the substrate 110. In some examples, the nozzle layer 11 is an integral part of the substrate 110; in some examples, the nozzle layer 11 is a layer that is deposited onto the surface of the substrate 110. Fluid can be selectively ejected from the nozzle 22 of one or more of the fluid ejectors 150 to print onto a surface.

Fluid flows through each fluid ejector 150 along an ejector flow path 475. The ejector flow path 475 can include a pumping chamber inlet passage 17, a pumping chamber 18, a descender 20, and an outlet passage 26. The pumping chamber inlet passage 17 fluidically connects the pumping chamber 18 to the inlet feed channel 14 and can include, e.g., an ascender 16 and a pumping chamber inlet 15. The descender 20 is fluidically connected to a corresponding nozzle 22. An outlet passage 26 connects the descender 20 to an outlet feed channel 28, which is in fluidic connection with the return chamber 436 through a substrate outlet (not shown).

In the example of FIGS. 2 and 3, passages such as the substrate inlet 12, the inlet feed channel 14, and the outlet feed channel 28 are shown in a common plane. In some examples (e.g., in the examples of FIGS. 3A and 3B), one or more of the substrate inlet 12, the inlet feed channel 14, and the outlet feed channel 28 are not in a common plane with the other passages.

Figure 4A:
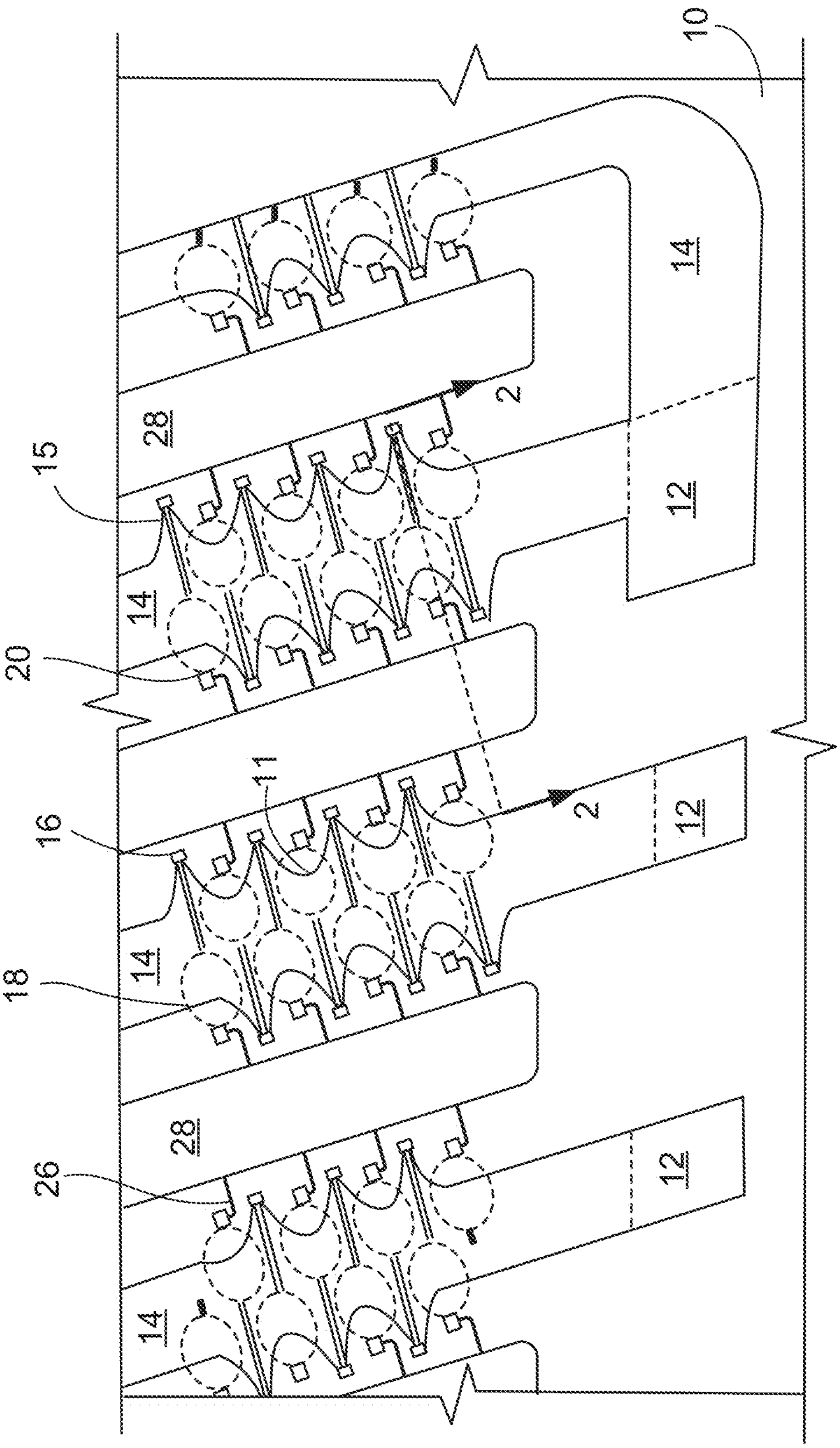
FIG. 4A is a cross sectional view of a portion of the printhead taken along line B-B in FIG. 2.
Figure 4B:
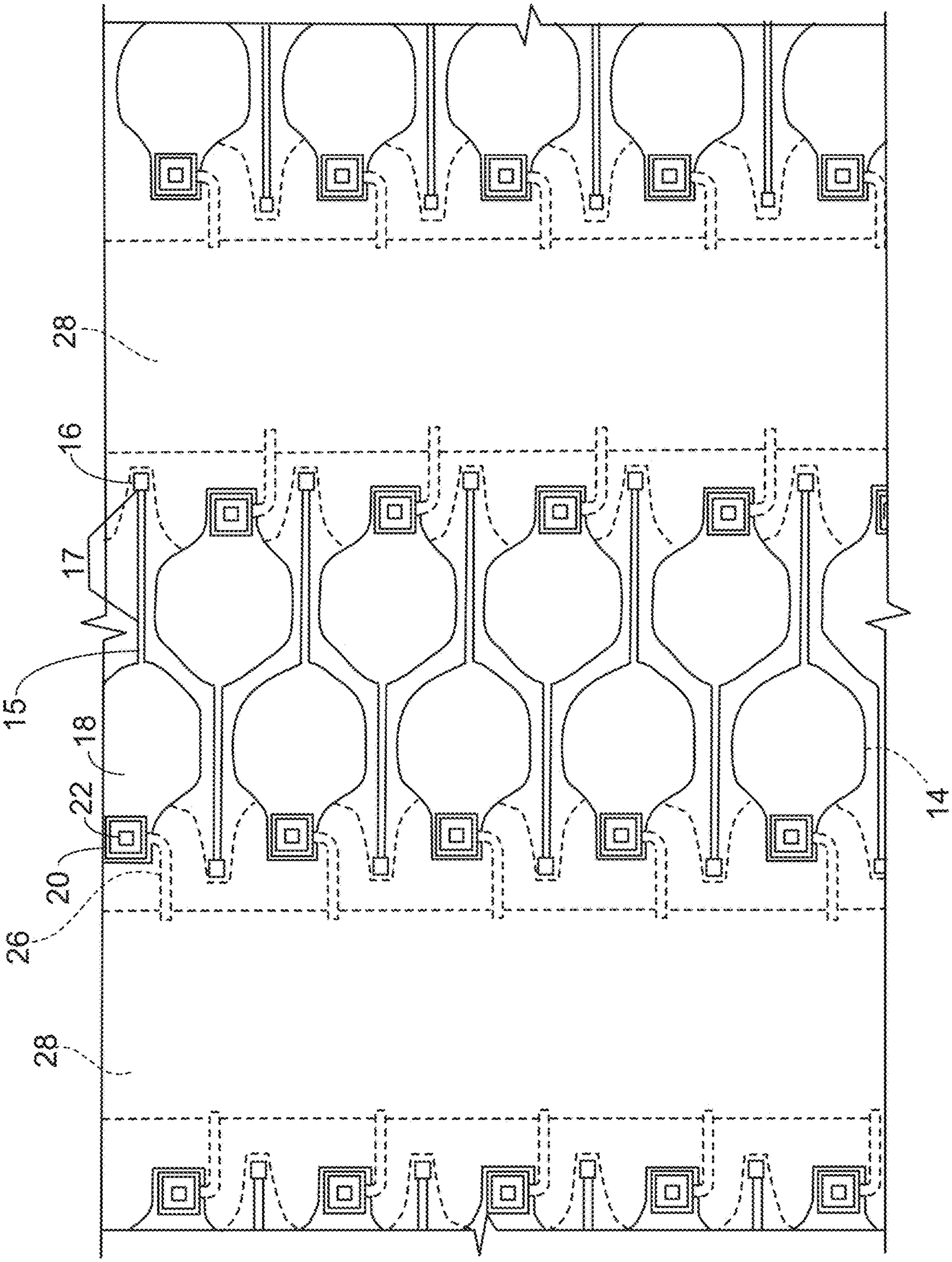
FIG. 4B is a cross sectional view of a portion of the printhead taken along line C-C in FIG. 2.

Referring to FIGS. 4A and 4B, the substrate 110 includes multiple inlet feed channels 14 formed therein and extending parallel with one another. Each inlet feed channel 14 is in fluidic communication with at least one substrate inlet 12 that extends perpendicular to the inlet feed channels 14. The substrate 110 also includes multiple outlet feed channels 28 formed therein and extending parallel with one another. Each outlet feed channel 28 is in fluidic communication with at least one substrate outlet (not shown) that extends perpendicular to the outlet feed channels 28. In some examples, the inlet feed channels 14 and the outlet feed channels 28 are arranged in alternating rows.

The substrate includes multiple fluid ejectors 150. Fluid flows through each fluid ejector 150 along a corresponding ejector flow paths 475, which includes an ascender 16, a pumping chamber inlet 15, a pumping chamber 18, and a descender 20. Each ascender 16 is fluidically connected to one of the inlet feed channels 14. Each ascender 16 is also fluidically connected to the corresponding pumping chamber 18 through the pumping chamber inlet 15.

The pumping chamber 18 is fluidically connected to the corresponding descender 20, which leads to the associated nozzle 22. Each descender 20 is also connected to one of the outlet feed channels 28 through the corresponding outlet passage 26. For instance, the cross-sectional view of fluid ejector of FIG. 3 is taken along line 2-2 of FIG. 4A.

The particular flow path configuration described here is an example of a flow path configuration. The approaches described here can also be used in other flow path configurations.

In some examples, the printhead 100 includes multiple nozzles 22 arranged in parallel columns 23. The nozzles 22 in a given column 23 can be all fluidically connected to the same inlet feed channel 14 and the same outlet feed channel 28. That is, for instance, all of the ascenders 16 in a given column can be connected to the same inlet feed channel 14 and all of the descenders in a given column can be connected to the same outlet feed channel 28.

In some examples, nozzles 22 in adjacent columns can all be fluidically connected to the same inlet feed channel 14 or the same outlet feed channel 28, but not both. For instance, in the example of FIG. 4A, each nozzle 22 in column 23*a* is fluidically connected to the inlet feed channel 14*a* and to the outlet feed channel 28*a*. The nozzles 22 in the adjacent column 23*b* are also connected to the inlet feed channel 14*a* but are connected to the outlet feed channel 28*b*. In some examples, columns of nozzles 22 can be connected to the same inlet feed channel 14 or the same outlet feed channel 28 in an alternating pattern. Further details about the printhead 100 can be found in U.S. Pat. No. 7,566,118, the contents of which are incorporated herein by reference in their entirety.

Referring again to FIG. 2, each fluid ejector 150 includes a corresponding actuator 30, such as a piezoelectric transducer or a resistive heater. The pumping chamber 18 of each fluid ejector 150 is in close proximity to the corresponding actuator 30. Each actuator 30 can be selectively actuated to pressurize the corresponding pumping chamber 18, thus ejecting fluid from the nozzle 22 that is connected to the pressurized pumping chamber.

In some examples, the actuator 30 can include a piezoelectric layer 31, such as a layer of lead zirconium titanate (PZT). The piezoelectric layer 31 can have a thickness of about 50 μm or less, e.g., about 1 μm to about 25 μm, e.g., about 2 μm to about 5 μm. In the example of FIG. 2, the piezoelectric layer 31 is continuous. In some examples, the piezoelectric layer 31 can be made discontinuous, e.g., by an etching or sawing step during fabrication. The piezoelectric layer 31 is sandwiched between a drive electrode 64 and a ground electrode 65. The drive electrode 64 and the ground electrode 65 can be metal, such as copper, gold, tungsten, indium-tin-oxide (ITO), titanium, platinum, or a combination of metals. The thickness of the drive electrode 64 and the ground electrode 65 can be, e.g., about 2 μm or less, e.g., about 0.5 μm.

A membrane 66 is disposed between the actuator 30 and the pumping chamber 18 and isolates the ground electrode 65 from fluid in the pumping chamber 18. In some examples, the membrane 66 is a separate layer; in some examples, the membrane is unitary with the substrate 110. In some examples, the actuator 30 does not include a membrane 66, and the ground electrode 65 is formed on the back side of the piezoelectric layer 31 such that the piezoelectric layer 31 is directly exposed to fluid in the pumping chamber 18.

To actuate the piezoelectric actuator 30, an electrical voltage can be applied between the drive electrode 64 and the ground electrode 65 to apply a voltage to the piezoelectric layer 31. The applied voltage causes the piezoelectric layer 31 to deflect, which in turn causes the membrane 66 to deflect. The deflection of the membrane 66 causes a change in volume of the pumping chamber 18, producing a pressure pulse (also referred to as a firing pulse) in the pumping chamber 18. The pressure pulse propagates through the descender 20 to the corresponding nozzle 22, thus causing a droplet of fluid to be ejected from the nozzle 22.

The membrane 66 can formed of a single layer of silicon (e.g., single crystalline silicon), another semiconductor material, one or more layers of oxide, such as aluminum oxide ($AlO_2$) or zirconium oxide ($ZrO_2$), glass, aluminum nitride, silicon carbide, other ceramics or metals, silicon-on-insulator, or other materials. For instance, the membrane 66 can be formed of an inert material that has a compliance such that the actuation of the actuator 30 causes flexure of the membrane 66 sufficient to cause a droplet of fluid to be ejected. In some examples, the membrane 66 can be secured to the actuator 30 with an adhesive layer 67. In some examples, two or more of the substrate 110, the nozzle layer 11, and the membrane 66 can be formed as a unitary body.

In some cases, when the actuator 30 of one of the fluid ejectors 150 is actuated, a pressure fluctuation can propagate through the ascender 16 of the fluid ejector 150 and into the inlet feed channel 14. Likewise, energy from the pressure fluctuation can also propagate through the descender 20 of the fluid ejector 150 and into the outlet feed channel 28. In some cases, this application refers to the inlet feed channel 14 and the outlet feed channel 28 generally as a feed channel 14, 28. Pressure fluctuations can thus develop in one or more of the feed channels 14, 28, that are connected to an actuated fluid ejector 150. In some cases, these pressure fluctuations can propagate into the ejector flow paths 475 of other fluid ejectors 150 that are connected to the same feed channel 14, 28. These pressure fluctuations can adversely affect the drop volume and/or the drop velocity of drops ejected from those fluid ejectors 150, degrading print quality. For instance, variations in drop volume can cause the amount of fluid that is ejected to vary, and variations in drop velocity can cause the location where the ejected drop is deposited onto the printing surface to vary. The inducement of pressure fluctuations in fluid ejectors is referred to as fluidic crosstalk.

In some examples, fluidic crosstalk can be caused by slow dissipation of the pressure fluctuations in the feed channels 14, 28. In some examples, fluidic crosstalk can be caused by standing waves that develop in the feed channels 14, 28. For instance, a pressure fluctuation that propagates into a feed channel 14, 28 when the actuator 30 of one of the fluid ejectors 150 is actuated can develop into a standing wave.

When fluid ejection occurs at a frequency that reinforces the standing wave, the standing wave in the feed channel 14, 28 can cause pressure oscillations to propagate into the ejector flow paths 475 of other fluid ejectors 150 connected to the same feed channel 14, 28, causing fluidic crosstalk among those fluid ejectors 150.

Fluidic crosstalk can also be caused by a sudden change in fluid flow through the feed channels 14, 28. In general, when a fluid in motion in a flow channel is forced to stop or change direction suddenly, a pressure wave can propagate in the flow channel (sometimes referred to as the "water hammer" effect). For instance, when one or more fluid ejectors 150 connected to the same feed channel 14, 28 are suddenly turned off, the water hammer effect causes a pressure wave to propagate into the flow channel 14, 28. That pressure wave can further propagate into the ejector flow paths 475 of other fluid ejectors 150 that are connected to the same feed channel 14, 28, causing fluidic crosstalk among those fluid ejectors 150.

Fluidic crosstalk can be reduce by providing greater compliance in the fluid ejectors to attenuate the pressure fluctuations. By increasing the compliance available in the fluid ejectors, the energy from a pressure fluctuation generated in one of the fluid ejectors can be attenuated, thus reducing the effect of the pressure fluctuation on the neighboring fluid ejectors.

Compliance in a fluid ejector and its associated fluid flow passages is available in the fluid, the meniscus at the nozzle, and the surfaces of the fluid flow passages (e.g., the inlet feed channel 14, the pumping chamber inlet passage 17, the descender 20, the outlet passage 26, the outlet feed channel 28, and other fluid flow passages).

The compliance of the fluid in the feed channel is given by $$C_{fluid} = \frac{V}{B}$$

where V is the volume of the fluid in the feed channel and B is the bulk modulus of the fluid.

The compliance of a single meniscus is given by $$C_{meniscus} = \frac{\pi r^4}{3\sigma}$$

where r is the radius of the meniscus and σ is the surface tension.

The compliance of a rectangular surface (such as a surface of the inlet or outlet feed channel) is given by (for fixed end conditions)

$$C_{wall} = \frac{1}{60}\frac{lw^5}{Et_w^3}$$

where l, w, and $t_w$ are the length, width, and thickness of the surface, respectively. Each surface of the inlet and outlet feed channels has some compliance. In some fluid ejectors, the most compliant surface of the feed channel is the bottom surface formed by the silicon nozzle layer 11.

In one specific example, a printhead has a feed channel (e.g., an inlet feed channel 14 or an outlet feed channel 28) that serves 16 fluid ejectors (hence there are 16 menisci associated with the feed channel). The feed channel has a width of 0.39 mm, a depth of 0.27 mm, and a length of 6 mm. The thickness of the silicon nozzle layer 11 is 30 μm and the modulus of the nozzle layer is 186E9 Pa. The radius of each meniscus is 7 μm. A typical bulk modulus for a water-based inks is about B=2E9 Pa and a typical surface tension is about 0.035 N/m.

For this example, the compliance of the fluid in the feed channel, the 16 menisci, and the nozzle layer in the feed channel are given in Table 1. Notably, the nozzle layer in the feed channel has the lowest compliance.

TABLE 1

Compliance values for the fluid in the feed channel, the menisci of the 16 nozzles fed by the feed channel, and the nozzle layer of the feed channel.

| | Compliance ($m^3$/Pa) |
|---|---|
| Fluid | 316E−21 |
| Menisci | 1.15E−18 |
| Nozzle layer | 180E−21 |

Increasing the compliance in a fluid ejector 150 and its associated fluid flow passages can help to mitigated fluidic crosstalk among fluid ejectors 150. By increasing the available compliance, the propagation of a pressure fluctuation from a particular fluid ejector 150 to a neighboring fluid ejector 150 can be attenuated within the fluid ejector 150*s* or the inlet and/or outlet feed channels 14, 28 to which the fluid ejector 150 is connected, thus reducing the effect of that pressure fluctuation on other fluid ejectors 150. For instance, the compliance of a feed channel 14, 28 can be increased to mitigate fluidic crosstalk among fluid ejectors 150 connected to that feed channel 14, 28.

Referring again to FIG. 3, compliance can be added to the inlet feed channel 14, the outlet feed channel 28, or both, by forming compliant microstructures 50 on one or more surfaces of the inlet feed channel 14 and/or the outlet feed channel 28. For instance, in the example of FIG. 3, compliant microstructures 50 are formed in a bottom surface 52 of the inlet feed channel 14 and a bottom surface 54 of the outlet feed channel. In this example, the bottom surfaces 52, 54 are formed by the nozzle layer 11. The additional compliance provided by the compliant microstructures 50 in a feed channel 14, 28 attenuates the energy from a pressure fluctuation in a particular fluid ejector 150 that is connected to that feed channel 14, 28. As a result, the effect of that pressure fluctuation on other fluid ejectors 150 connected to that same feed channel 14, 28 can be reduced.

Figure 5A:
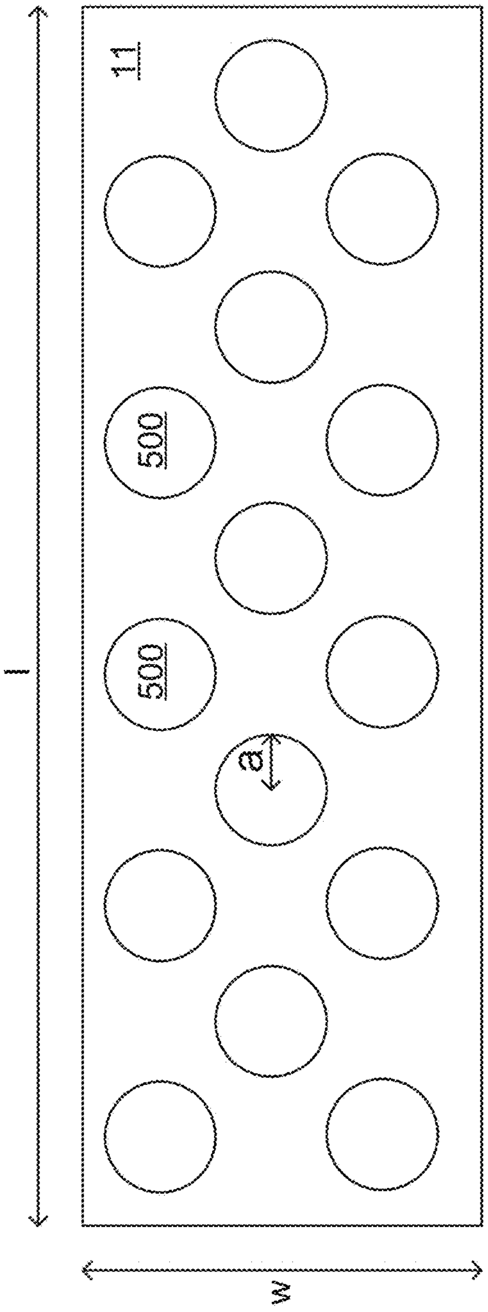
FIGS. 5A and 5B are a top view and a side view, respectively, of a feed channel with recesses.
Figure 5B:
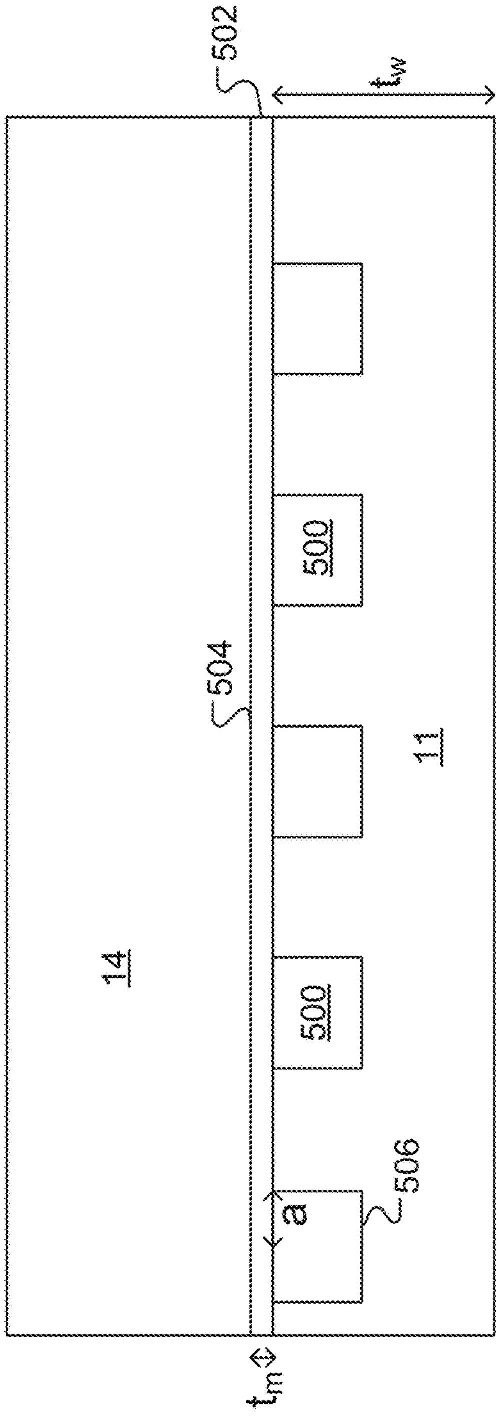

Referring to FIGS. 5A and 5B, in some embodiments, the compliant microstructures 50 formed in the nozzle layer 11 of the inlet feed channel 14 and/or the outlet feed channel 28 can be recesses 500 covered by a thin membrane 502. The membrane 502 is disposed over the recesses 500 such that an inner surface 504 of the nozzle layer 11 facing into the feed channel 14, 28 is substantially flat. In some cases, e.g., when a vacuum is present in the recess 500, the membrane 502 can be slightly deflected into the recess 500. In some examples, the recesses 500 can be formed in the nozzle layer 11, which we also refer to as the bottom wall of the inlet or outlet feed channel 14, 28. In some examples, the recesses 500 can be formed in a top wall of the inlet or outlet feed channel, which is the wall opposite the bottom wall. In some examples, the recesses 500 can be formed in one or more side walls of the inlet or outlet feed channel 14, 28, which are the walls that intersect the top and bottom walls.

When a pressure fluctuation propagates into the feed channel 14, 28, the membrane 502 can deflect into the recesses, attenuating the pressure fluctuation and mitigating fluidic crosstalk among neighboring fluid ejectors 150 connected to that feed channel 14, 28. The deflection of the membrane 502 is reversible such that when the fluid pressure in the feed channel 14, 28 is reduced, the membrane 502 returns to its original configuration.

The recesses 500 can have a lateral dimension (e.g., a radius) of between about 50 μm and about 150 μm, e.g., about 100 μm. For instance, the lateral dimension of the recesses 500 can be between about 10% and about 75% of the width of the feed channel surface, e.g., about 50% of the width of the feed channel surface. The recesses 500 can have a depth of between about 5 μm and about 15 μm, e.g., about 6-10 μm. The recesses 500 can be provided at a density of between about 10 recesses/$mm^2$ and about 50 recesses/$mm^2$, e.g., about 20 recesses/$mm^2$. In the example of FIGS. 5A and 5B, the recesses 500 are circular. In some examples, the recesses 500 can be other shapes, such as ovals, ellipses, or other shapes. For instance, the recesses 500 can be shaped such that there are no sharp corners where mechanical stresses can be concentrated. The recesses 500 can be positioned in ordered arrays, e.g., rows and columns, although this is not necessary. For example, the recesses 500 can be randomly distributed.

In some examples, the membrane 502 can be formed of silicon. In some examples, the membrane 502 can be formed of an oxide, such as $SiO_2$. In some examples, the membrane 502 can be formed of a metal, e.g., a sputtered metal layer. In general, the membrane 502 is thin enough to be able to deflect responsive to pressure fluctuations in the feed channel 14, 28. In addition, the membrane 502 is thick enough to be durable. The overall elastic modulus of the membrane 502 should be sufficient that the membrane will not deflect all the way to the bottom 506 of the recesses 500 under expected pressure fluctuations in operation, as otherwise the membrane 502 could break or bond to the bottom 506 of the recesses 500. For instance, the membrane can have a thickness of between about 0.5 μm and about 5 μm, e.g., about 1 μm, about 2 μm, or about 3 μm.

The presence of multiple recesses 500 in each feed channel 14, 28 can help to ensure that the compliance of the nozzle layer 11 in the feed channel 14, 28 can be reduced even if one or more membranes 502 fail (e.g., by breaking or bonding to the bottom 506 of a recess 500).

The membrane 502 can seal the recesses 500 against fluids, such as liquids (e.g., ink) and gases (e.g., air). In some examples, the recesses 500 are vented during fabrication and then sealed such that a desired pressure is achieved in the recesses, e.g., atmospheric pressure (atm), ½ atm, or another pressure. In some examples, the recesses 500 are not vented such that there is a vacuum in the recesses. The existence of a vacuum in the recesses 500 can increase the stress on the membrane 502 and can reduce the added compliance provided by the recesses 500.

The compliance of the nozzle layer 11 in the feed channel, including the 48 recesses, can be calculated by $$C = N\frac{\pi a^2}{192D}$$

where N is the number of recesses and a is the radius of each recess. D is given by $$D = \frac{Et_m^3}{12(1-v^2)}$$

where E is the modulus of the membrane, $t_m$ is the thickness of the membrane, and v is the Poisson's ratio of the membrane.

The center deflection of the membranes can be calculated by $$y_c = -\frac{qa^4}{64D}$$

where q is the design pressure load of the membrane. This center deflection expression applies in cases in which the deflections are small, e.g., for a deflection of up to about 5% of the thickness of the membrane. In some examples, greater deflections can deviate from this expression. For instance, an example membrane 502 that is 2 μm thick deflects 3.2 μm and is 3.5 times stiffer than predicted by this expression.

The tensile stress in the membrane 502 can be calculated by $$\sigma = 0.75q\left(\frac{a}{t}\right)^4$$

In one specific example, 48 recesses of 100 μm radius are formed in the nozzle layer 11 in a feed channel 14, 28 having the dimensions and modulus given above. The membrane 502 covering the recesses is formed of $SiO_2$ thermal oxide and has a thickness of 2.0 μm, a modulus of 75E9 Pa, and a Poisson's ratio of 0.17. The recesses 500 are unvented. The design pressure load q is set to 150000 Pa, to account for 1 atm for the vacuum in the recesses and 0.5 atm for the purge pressure of the feed channel.

For this example, the compliance of the nozzle layer 11, the center deflection of the membrane 502, and the tensile stress in the membrane 502 are given in the first column Table 2. Notably, the presence of the 48 recesses increased the compliance of the nozzle layer by a factor of about nine relative to the nozzle layer without recesses (discussed above and in Table 1).

TABLE 2

Compliance of a nozzle layer in the feed channel, center deflection of the membrane, and tensile stress in the membrane.

| | Compliant membrane | Standard membrane |
|---|---|---|
| Compliance C | 15.3E−18 $m^3$/Pa | 6.1E−18 $m^3$/Pa |
| Center deflection $y_c$ | −4.6 μm | −2.5 μm |
| Tensile stress σ | 281E6 Pa | 264E6 Pa |

In some cases, the membrane 502 is deposited under compressive stress, which can increase the center deflection $y_c$ beyond that given in Table 2. For instance, the center deflection of the membrane 502 can become more than half the thickness of the membrane. In these situations, the stiffness of the membrane is increased and the stress for a given load is less (described in greater detail in section 11.11 of Roark's Formulas for Stress and Strain, 7$^{th}$ edition, the contents of which are incorporated herein by reference in their entirety). For instance, in the example given above, the center deflection of the membrane is 2.3 times the thickness of the membrane. Thus, the stiffness of the membrane is increased by a factor of 2.5. The compliance, center deflection, and tensile stress taking this increased stiffness into account are given in the second column of Table 2. The compliance of the nozzle layer with recesses is still increased by a factor of 3.5 relative to the nozzle layer without recesses.

These calculations show that the presence of recesses 500 in the nozzle layer 11 can significantly increase the compliance of the nozzle layer 11. A nozzle layer 11 having such recesses 500 can thus attenuate a pressure fluctuation in a feed channel 14, 28 more effectively than a flat nozzle layer 11, mitigating fluidic crosstalk among fluid ejectors 150 connected to that feed channel 14, 28.

Figure 6A:
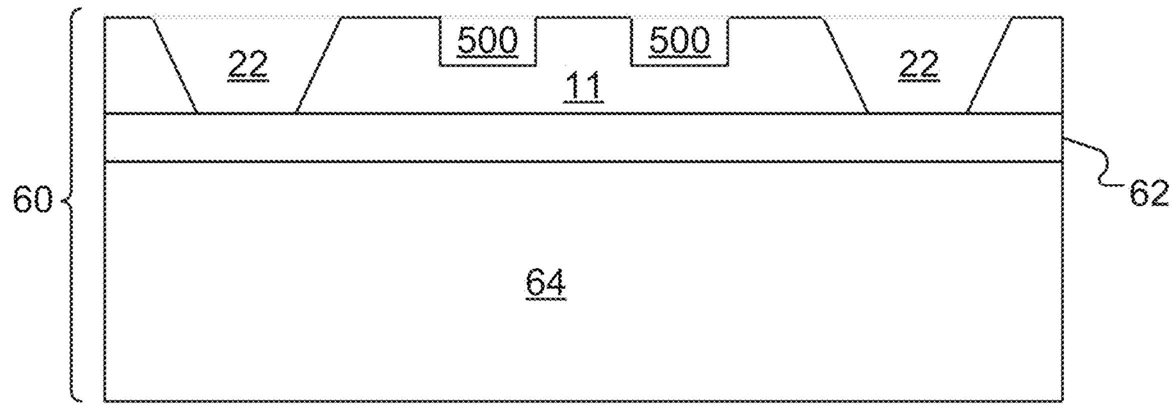
FIGS. 6A-6F are diagrams of an approach to fabricating fluid ejectors having recesses.

FIGS. 6A-6F show one approach to fabricating fluid ejectors 150 having recesses 500 formed in the nozzle layer 11. Referring to FIGS. 6A and 7, a nozzle wafer 60 (e.g., a silicon wafer) includes the nozzle layer 11 (e.g., a silicon nozzle layer), an etch stop layer 62 (e.g., an oxide or nitride etch stop layer, such as $SiO_2$ or $Si_3N_4$), and a handle layer 64 (e.g., a silicon handle layer). In some examples, the nozzle wafer 60 does not include the etch stop layer 62. In some examples, the nozzle wafer 80 is a silicon-on-insulator (SOI) wafer and the insulator layer of the SOI wafer acts as the etch stop layer 84.

Openings that will provide the nozzles 22 are formed through the nozzle layer 11 (700), e.g., using standard microfabrication techniques including lithography and etching.

Recesses 500 that extend partially, but not entirely, through the nozzle layer 11 are also formed (702), e.g., using standard microfabrication techniques including lithography and etching. For instance, a first layer of resist can be deposited onto the unpatterned nozzle layer 11 and lithographically patterned. The nozzle layer 11 can be etched, e.g., with a deep reactive ion etch (DRIE), to form the nozzles 22. The first layer of resist can be stripped, and a second layer of resist can then be deposited onto the nozzle layer 11 and lithographically patterned. The nozzle layer 11 can be etched according to the patterned resist to form the recesses 500, e.g., using a wet etch or dry etch.

Figure 6B:
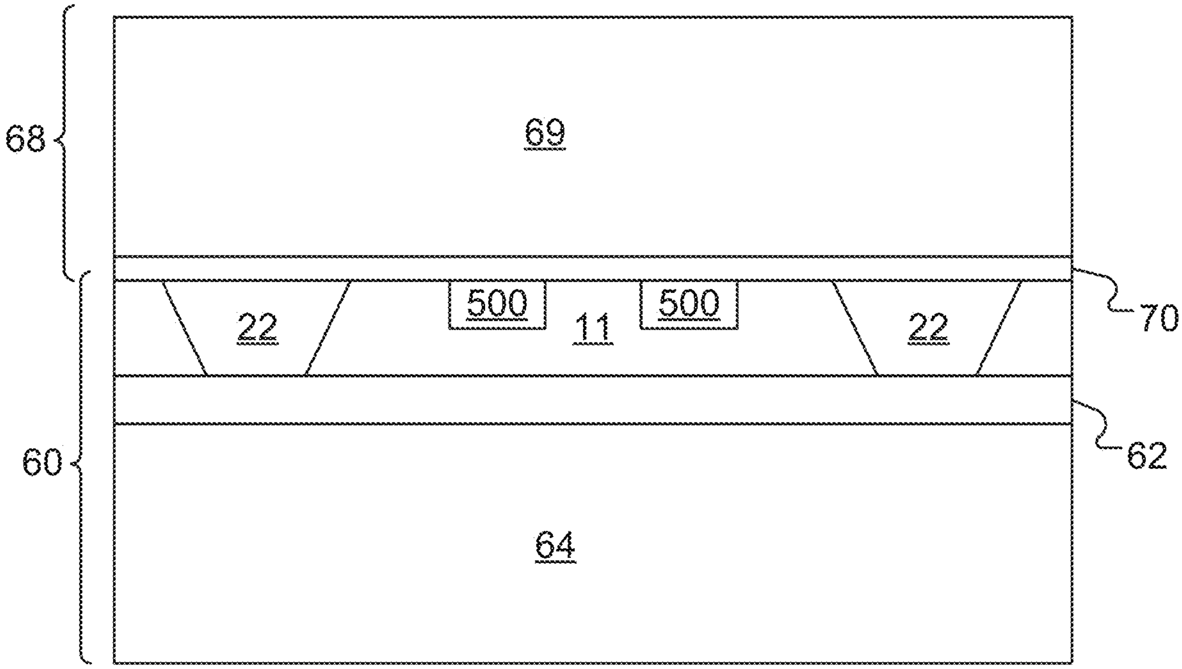
Figure 7:
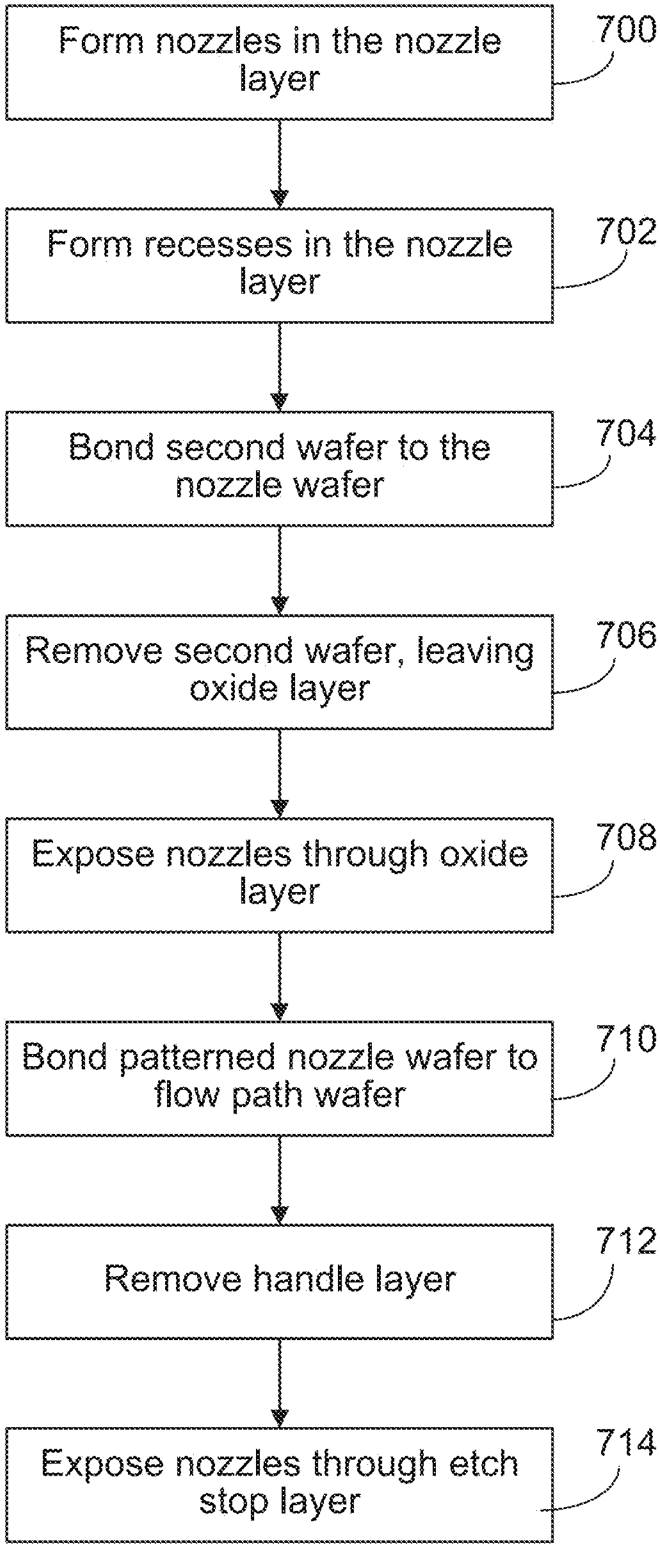
FIG. 7 is a flowchart.

Referring to FIGS. 6B and 7, a second wafer 68 having a handle layer 69 and a membrane layer 70, that will provide the membrane 502 is bonded to the nozzle wafer 60. In particular, the membrane layer 70 is bonded to the nozzle layer 11 of the nozzle wafer 60 (704), e.g., using thermal bonding or another wafer bonding technique. The layer membrane 70 can be an oxide (e.g., $SiO_2$ thermal oxide).)

Figure 6C:
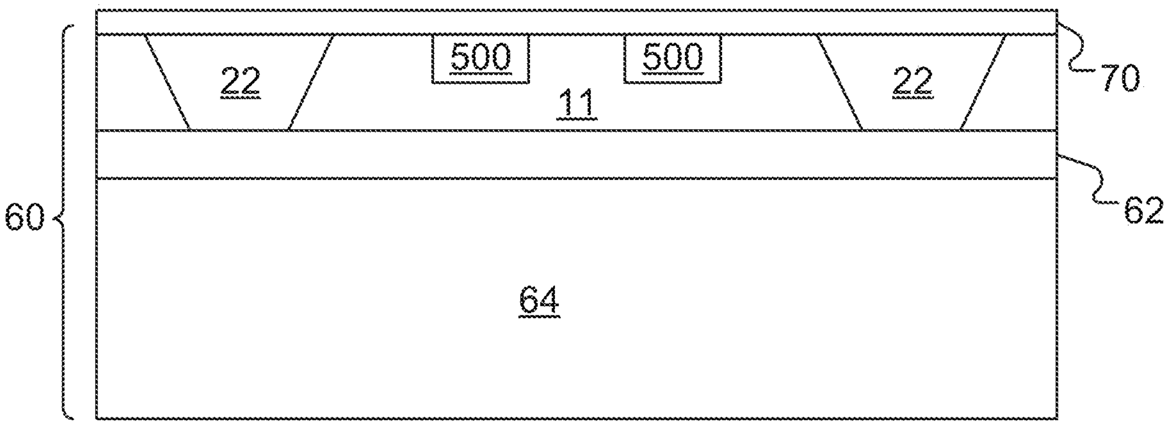
Figure 6D:
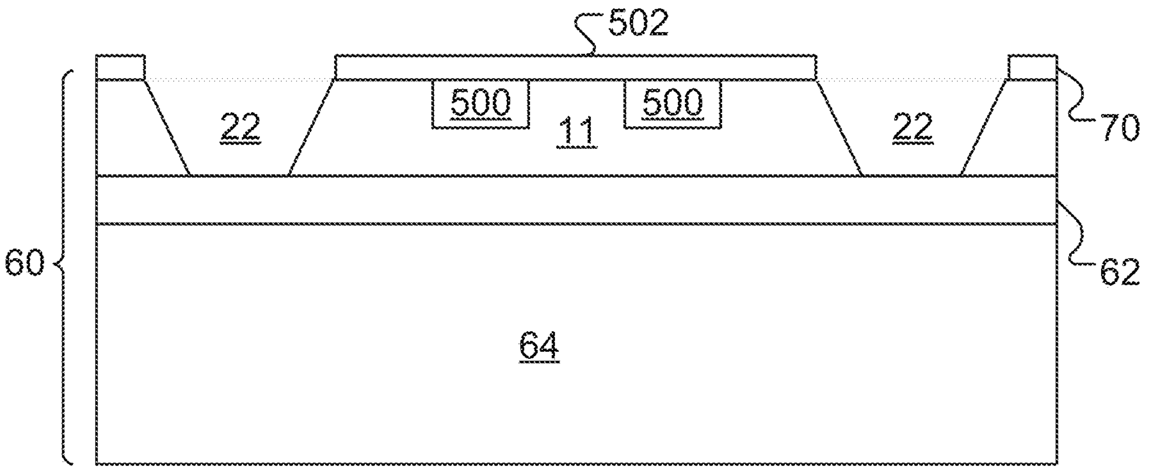

Referring to FIGS. 6C and 7, the handle layer 69 is removed (706), e.g., by grinding and polishing, wet etching, plasma etching, or another removal process, leaving only the membrane layer 70. Referring to FIGS. 6D and 7, the membrane layer 70 is masked and etched, e.g., using standard microfabrication techniques including lithography and etching, to expose the nozzles 22 (708). The portions of the membrane layer 70 that remain form the membrane 502 over the recesses 500.

Figure 6E:
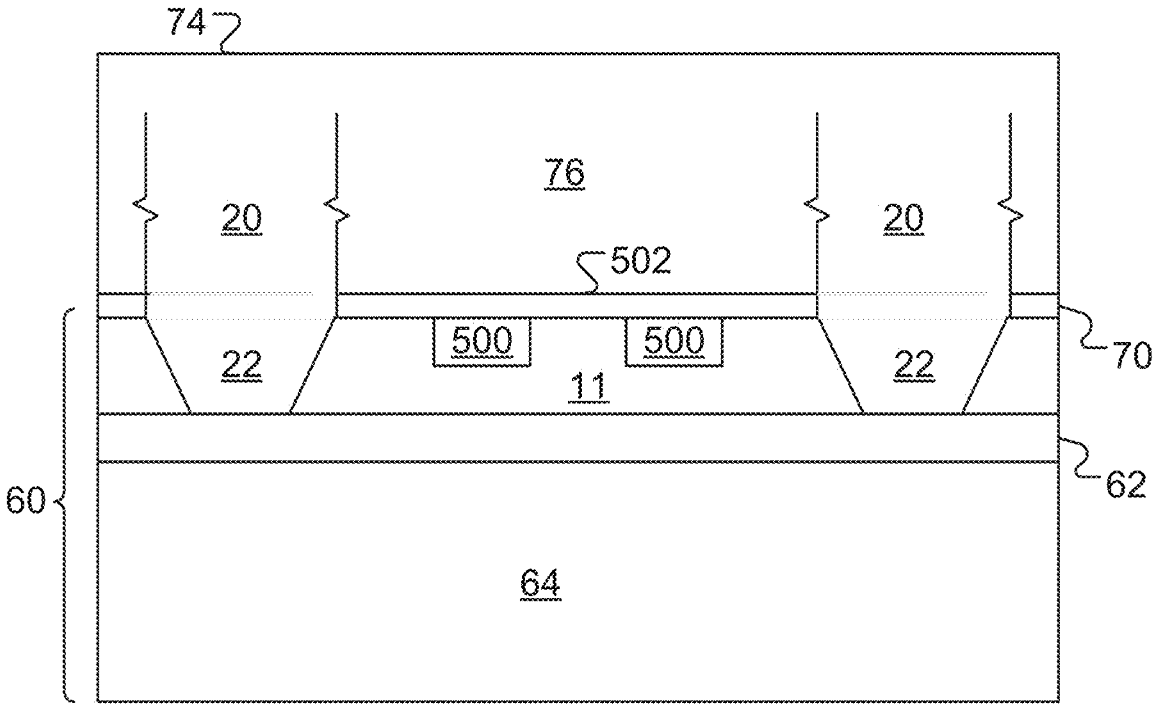

The patterned nozzle wafer 60 having nozzles 22 and recesses 500 formed therein can be further processed, e.g., as described in U.S. Pat. No. 7,566,118, the contents of which are incorporated herein by reference in their entirety, to form the fluid ejectors 150 of the printhead 100. Referring to FIGS. 6E and 7, in some examples, a top face 74 of the patterned nozzle wafer 60 can be bonded to a flow path wafer 76 (710) having flow passages such as descenders 20 and other flow passages (not shown), actuators (not shown), and other elements formed therein. For instance, the top face 74 of the nozzle wafer 60 can be bonded to the flow path wafer 76 using low-temperature bonding, such as bonding with an epoxy (e.g., benzocyclobutene (BCB)) or using low-temperature plasma activated bonding.

Figure 6F:
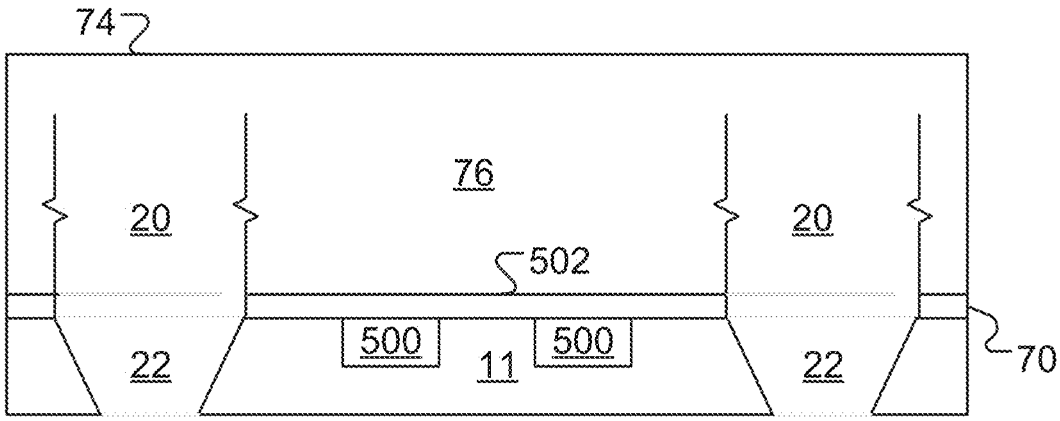

Referring to FIGS. 6F and 7, the handle layer 64 can then be removed (712), e.g., by grinding and polishing, wet etching, plasma etching, or another removal process. The etch stop layer 62, if present, is either removed (as shown in FIG. 6F) or masked and etched, e.g., using standard microfabrication techniques including lithography and etching, to expose the nozzles (714).

In some examples, a thick nozzle wafer 60 can be used (e.g., 30 μm, 50 μm, or 100 μm thick). The use of a thick nozzle wafer minimizes the risk that the nozzle fabrication process will thin the nozzle wafer to an extent that the nozzle wafer is weakened.

Figure 8A:
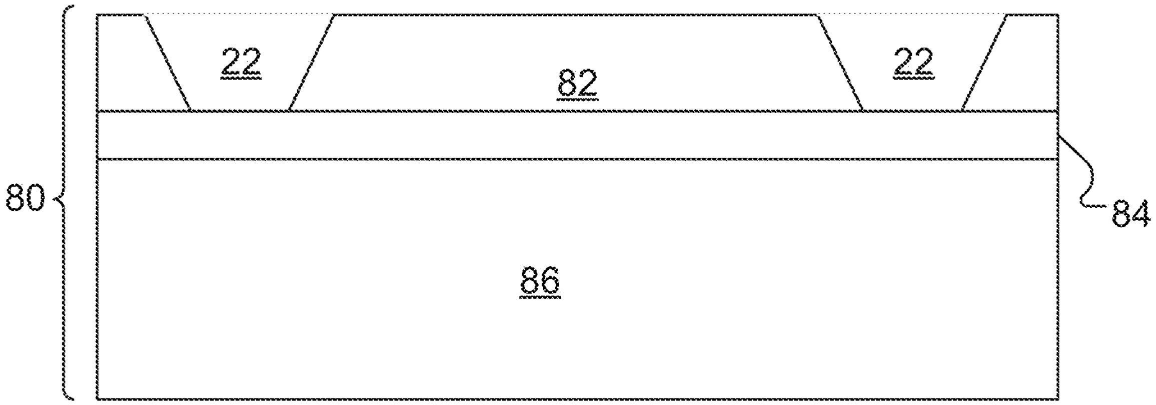
FIGS. 8A-8F are diagrams of an approach to fabricating fluid ejectors having recesses.

FIGS. 8A-8D show another approach to fabricating fluid ejectors 150 having recesses 500 in the nozzle layer. Referring to FIGS. 8A and 9, a nozzle wafer 80 (e.g., a silicon wafer) includes a nozzle sublayer 82 (e.g., a silicon nozzle sublayer), an etch stop layer 84 (e.g., an oxide or nitride etch stop layer, such as $SiO_2$ or $Si_3N_4$), and a handle layer 86 (e.g., a silicon handle layer). In some examples, the nozzle wafer 80 does not include the etch stop layer 84. In some examples, the nozzle wafer 80 is a silicon-on-insulator (SOI) wafer and the insulator layer of the SOI wafer acts as the etch stop layer 84.

Openings that will provide the nozzles 22 are formed through the nozzle sublayer 82 (900), e.g., using standard microfabrication techniques including lithography and etching.

Figure 8B:
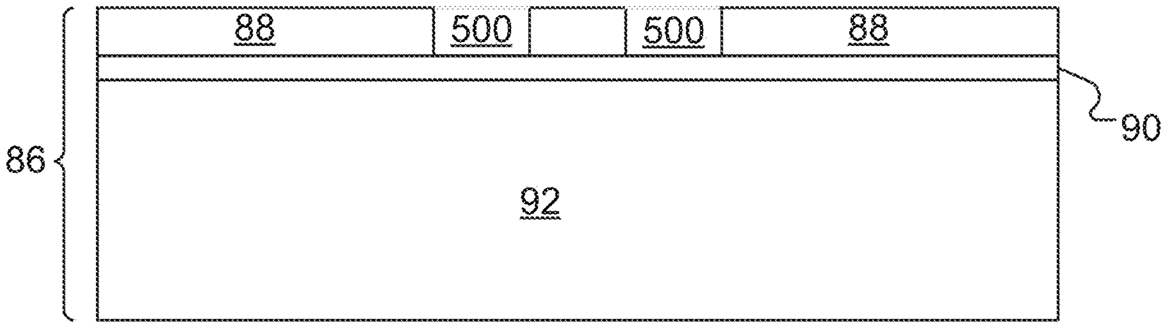
Figure 9:
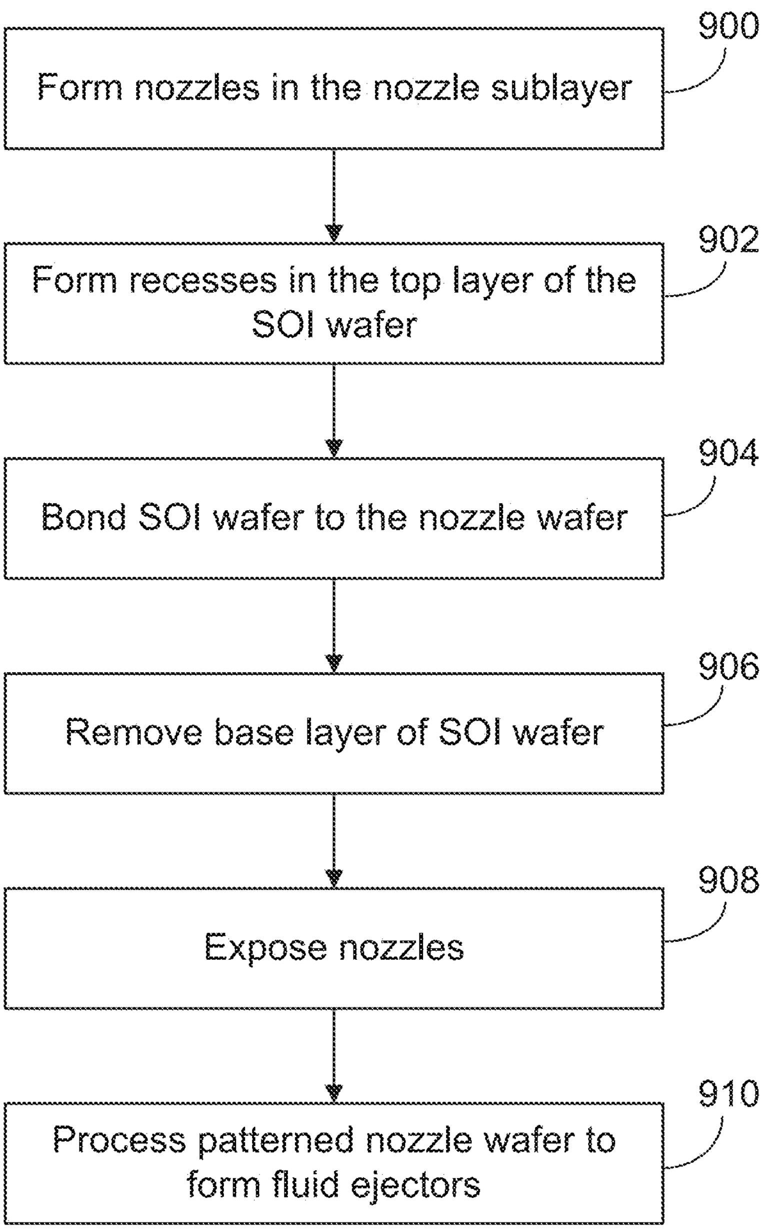
FIG. 9 is a flowchart.

Referring to FIGS. 8B and 9, a second wafer 86 includes a top layer 88, an etch stop layer 90 (e.g., an oxide or nitride etch stop layer, such as $SiO_2$ or $Si_3N_4$), and a handle layer of silicon 92. The top layer 88 can be formed of the same material as the nozzle sublayer 82 (e.g., silicon). Recesses 500 are etched into, e.g., through, the top layer 88 of the SOI wafer 86 (902), e.g., using standard microfabrication techniques including lithography and etching. In some examples, the second wafer 86 is an SOI wafer and the insulator layer of the SOI wafer acts as the etch stop layer 90.

Figure 8C:
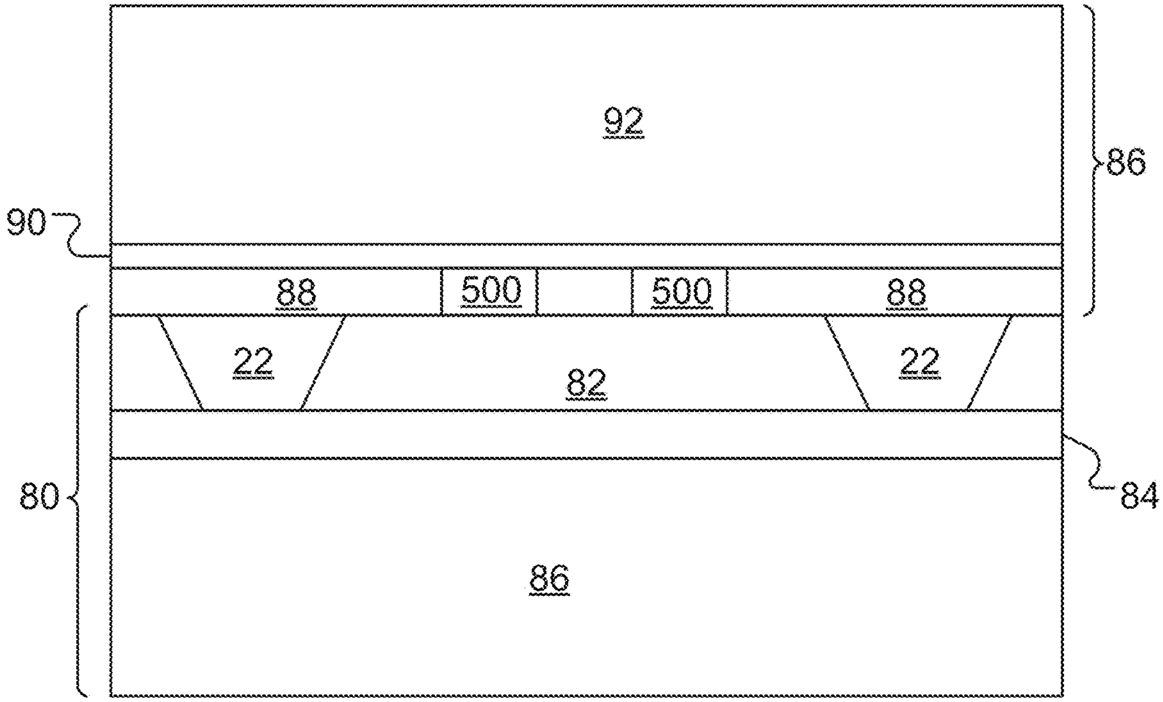

Referring to FIGS. 8C and 9, the SOI wafer 86 is bonded to the nozzle wafer 80 (904), e.g., using thermal bonding or another wafer bonding technique, such that the top layer 88 of the SOI wafer 86 is in contact with the nozzle sublayer 82 of the nozzle wafer 80. The recesses 500 and nozzles 22 are aligned, e.g., by utilizing bond alignment targets (not shown) fabricated on the SOI wafer 86 and the nozzle wafer 80. For instance, the alignment targets can include alignment indicators, such as verniers, to show the amount of misalignment between the SOI wafer 86 and the nozzle wafer 80. In some examples, the SOI wafer 86 and the nozzle wafer 80 are aligned with an alignment tool that utilizes cameras, such as infrared cameras, to view the alignment targets through the silicon wafers.

Figure 8D:
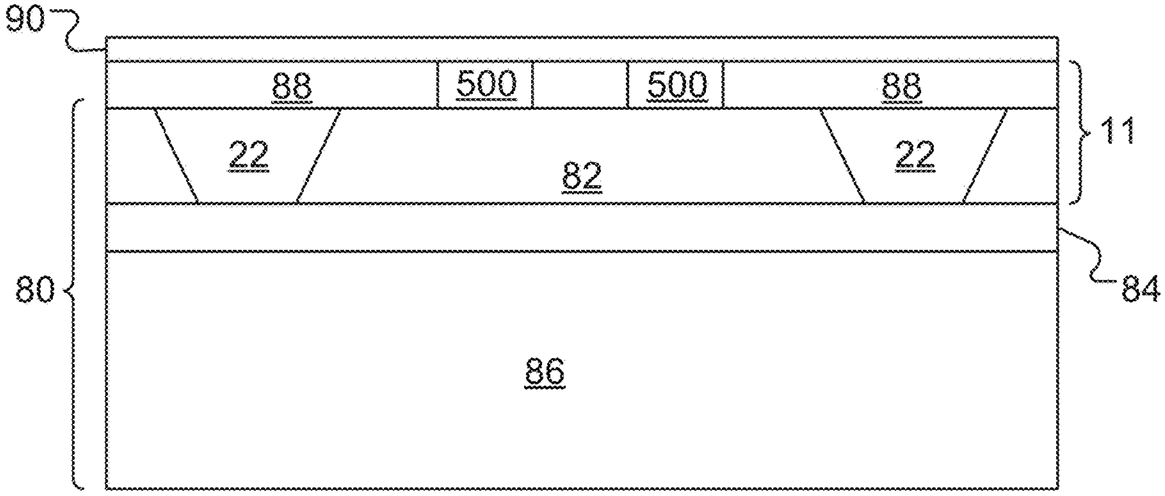
Figure 8E:
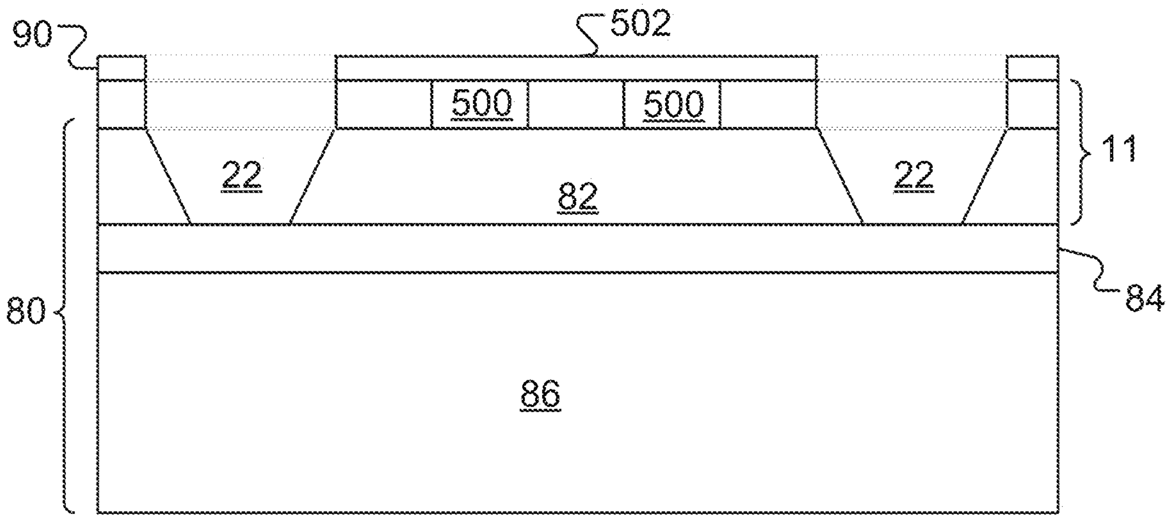

Referring to FIGS. 8D and 9, the handle layer 92 of the SOI wafer 86 is removed (906), e.g., by grinding and polishing, wet etching, plasma etching, or another removal process. Referring to FIGS. 8E and 9, the insulator layer 90 and top layer 88 are masked and etched, e.g., using standard microfabrication techniques including lithography and etching, to expose the nozzles 22 (908). The insulator layer 88 that remains forms the membrane 502 over the recesses 500.

In the approach of FIGS. 8A-8E, the nozzle sublayer 82 and the top layer 88 together form the nozzle layer 11. The patterned nozzle wafer 80 can be further processed to form the fluid ejectors 150 of the printhead (910), e.g., as shown in FIGS. 6E and 6F and as described in U.S. Pat. No. 7,566,118, the contents of which are incorporated herein by reference in their entirety.

Figure 8F:
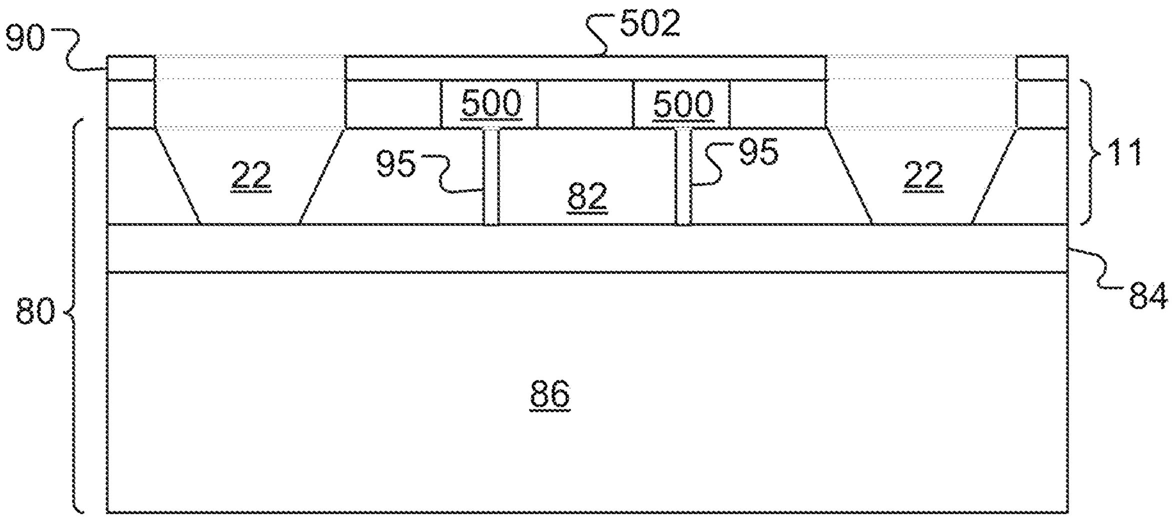

Referring to FIG. 8F, in some examples, the recesses 500 can be vented such that the air in the recesses is at atmospheric pressure. To fabricate vented recesses, straight bore vents 95 are etched into the nozzle sublayer 82 of the nozzle wafer 80 prior to bonding the nozzle wafer 80 with the SOI wafer 86. The vents 95 are etched through the thickness of the nozzle sublayer 82 and to the etch stop layer 84. The straight bore vents 95 are positioned such that the vents 95 will align with the recesses 500 when the nozzle wafer 80 is bonded with the SOI wafer 86. When the nozzles 22 are opened by removal of the handle layer 86 and the etch stop layer 84, the vents 95 will be open to the atmosphere, thus venting the interior space of the recesses 500.

Figure 10:
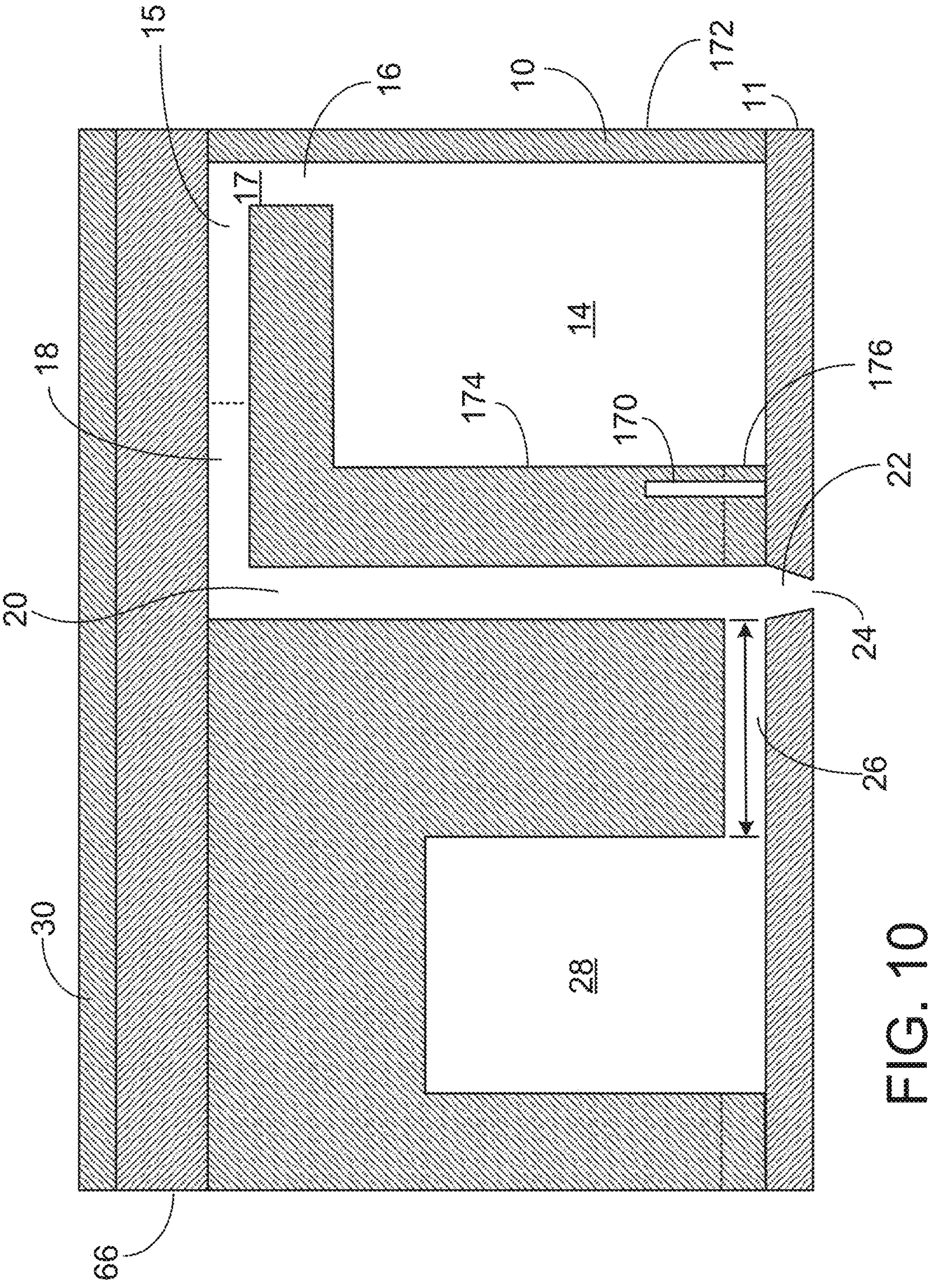
FIG. 10 is a cross sectional view of a fluid ejector having side wall compliant microstructures.

Referring to FIG. 10, in some examples, compliant microstructures can be added to the side walls 172, 174 of the inlet feed channel 14 and/or the outlet feed channel 28. For instance, one or more recess slots 170 can be formed adjacent to one or both side walls 172, 174, leaving a side wall membrane 176 between the recess slots 170 and the interior of the feed channel 28. The side wall membrane 176 can deflect into the recess slots 170 in response to a pressure fluctuation to attenuate the pressure in the feed channel 14, 28. In some examples, the recess slots 170 can be formed by a DRIE vertical etch of the substrate 110 prior to bonding the nozzle layer 11 to the substrate 110. In some examples, the recess slots 170 can be formed using an anisotropic etch or a DRIE etch that is tapered outwards, where the etch is stopped by an etch stop layer, such as a thermal oxide grown on the side walls 172, 174.

Figure 11:
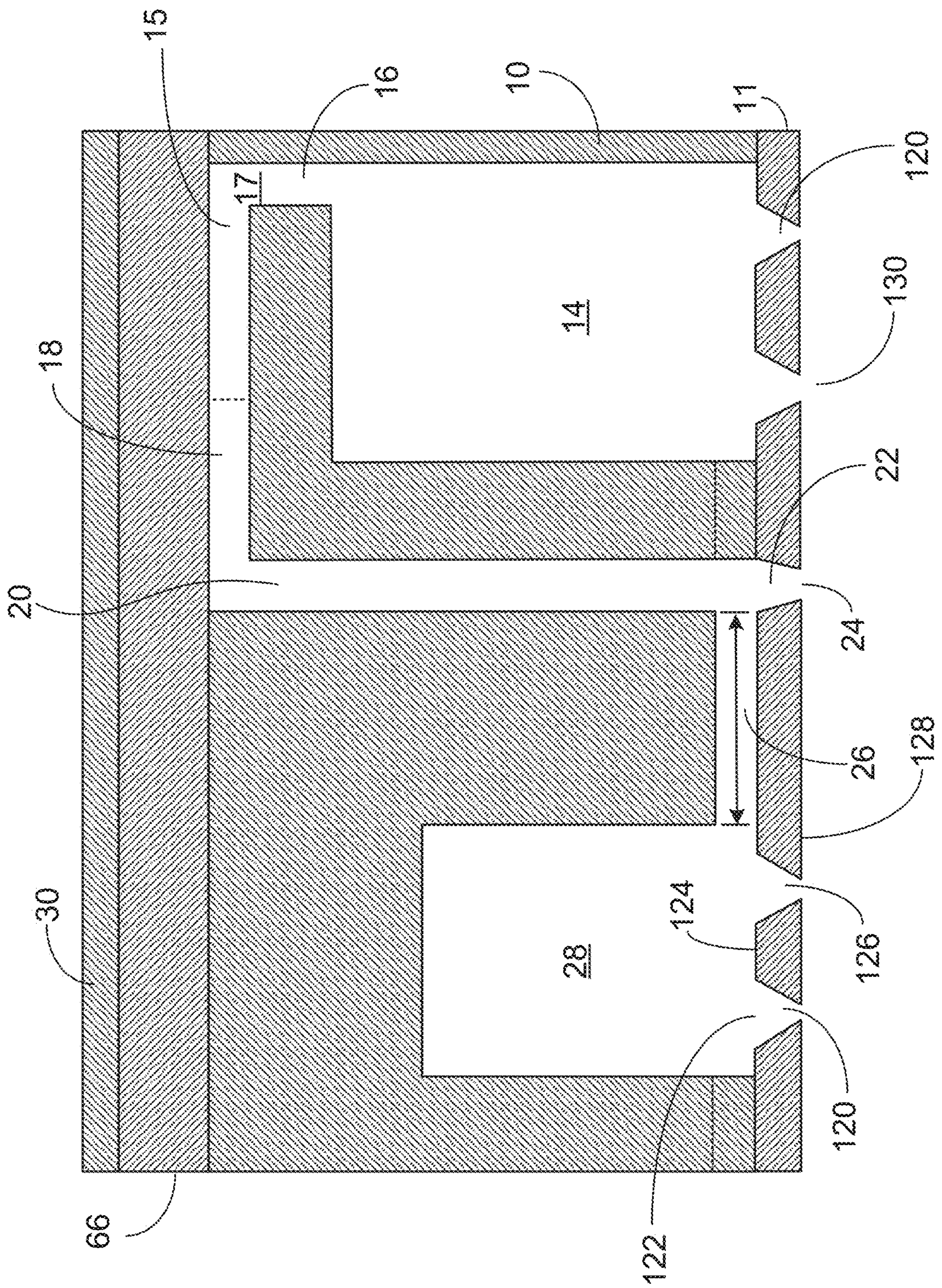
FIG. 11 is a side view of a feed channel with dummy nozzles.

Referring to FIG. 11, in some embodiments, the compliant microstructures 50 (FIG. 3) formed in the nozzle layer 11 of the inlet feed channel 14 and/or the outlet feed channel 28 can be nozzle-like structures 120, which this application sometimes refers to as dummy nozzles 120. (For clarity, we sometimes refer to the nozzles 22 of the fluid ejectors 150 as firing nozzles.) The dummy nozzles 120 are located in the feed channels 14, 28, and are not directly connected to or associated with any individual fluid ejector 150 and do not have corresponding actuators. The fluid pressure in the feed channels 14, 28 is generally not high enough to cause fluid to be ejected from the dummy nozzles 120 during normal operation. For instance, the fluid ejector 150 can operate at an ejection pressure of a few atmospheres (e.g., about 1-10 atm) and a threshold pressure for ejection can be about half of the operating pressure.

The dummy nozzles 120 extend through the entire thickness of the nozzle layer 11 and provide a free surface that increases the compliance of the nozzle layer 11. Each dummy nozzle 120 includes an inward facing opening 122 on an internal surface 124 of the nozzle layer 11 and an outward facing opening 126 on an external surface 128 of the nozzle layer 11 (e.g., the surface that faces toward the printing surface). A meniscus 130 of fluid is formed at the outward facing opening 126 of each dummy nozzle 120 (shown for only one dummy nozzle 120 in FIG. 11). In some examples, the feed channel 14, 28 is negatively pressurized such that, in the absence of a pressure fluctuation, the meniscus 130 is drawn inward from the opening 126 (e.g., a concave meniscus). When a pressure fluctuation propagates into the feed channel 14, 28, the meniscus 130 bulges out (e.g., a convex meniscus), attenuating the pressure fluctuation and mitigating fluidic crosstalk among neighboring fluid ejectors 150 connected to that feed channel 14, 28.

In some examples, the dummy nozzles 120 are similar in size and/or shape to the firing nozzles 22. For instance, the dummy nozzles 120 can be a generally cylindrical path of constant diameter, in which the inward facing opening 122 and the outward facing opening 126 have the same dimension. The dummy nozzles 120 can be a tapered, conically shaped path extending from a larger inward facing opening 122 to a smaller outward facing opening 126. The dummy nozzles 120 can include a curvilinear quadratic shaped path extending from a larger inward facing opening 122 to a smaller outward facing opening 126. The dummy nozzles 120 can include multiple cylindrical regions of progressively smaller diameter toward the outward facing opening 126.

When the dummy nozzles 120 are similar in size to the firing nozzles 22, the bubble pressure of the dummy nozzles 120 and the firing nozzles 22 is also similar. However, because the fluid pressure is generally lower in the feed channels 14, 28 than in the fluid ejectors 150, fluid can be ejected from the firing nozzles 22 without causing accidental discharge through the dummy nozzles 120. In some examples, the dummy nozzles 120 can have a different size than the firing nozzles 22.

In some examples, the ratio of the thickness of the dummy nozzles 120 (e.g., the thickness of the nozzle layer 11) and the diameter of the outward facing opening 128 can be about 0.5 or greater, e.g., about 1 to 4, or about 1 to 2. For instance, the radius of the outward facing opening 128 can be between about 5 μm and about 80 μm, e.g., about 10 μm to about 50 μm. For a tapered shape, the cone angle of the conically shaped path of the dummy nozzles 120 can be, e.g., between about 5° and about 45°. In general, the dummy nozzles 120 are small enough that large contaminant particles capable of clogging the firing nozzles 22 cannot enter the feed channels 14, 28 through the dummy nozzles 120.

In some examples, the printhead 100 can be purged at high fluid pressure, e.g., to clean the fluid flow passages. The high fluid pressure during a purge can cause fluid to be ejected from the dummy nozzles 120. To reduce fluid loss through the dummy nozzles 120 during such a purge, a small number of dummy nozzles 120 can be formed in each feed channel 14, 28. For instance, 1 to 20 dummy nozzles 120 can be formed in each feed channel 14, 28, e.g., about 1, 2, or 4 dummy nozzles per firing nozzle. In some examples, the dummy nozzles 120 can be capped during a purge such that little or no fluid is lost through the dummy nozzles 120.

Figure 12:
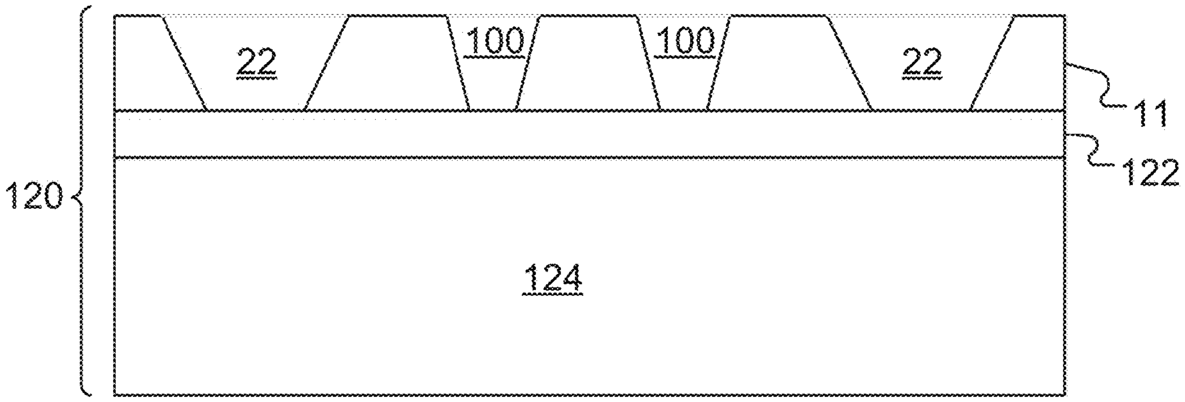
FIG. 12 is a diagram of an approach to fabricating fluid ejectors having dummy nozzles.

FIG. 12 shows an example approach to fabricating fluid ejectors 150 having dummy nozzles 120 formed in the nozzle layer 11. A nozzle wafer 140 includes the nozzle layer 11, an etch stop layer 142 (e.g., an oxide or nitride etch stop layer, such as $SiO_2$ or $Si_3N_4$), and a handle layer 124 (e.g., a silicon handle layer). In some examples, the nozzle wafer 120 does not include the etch stop layer 122.

The firing nozzles and dummy nozzles 120 are formed through the nozzle layer 11, e.g., using standard microfabrication techniques including lithography and etching. In some implementations, the firing nozzles 22 and dummy nozzles 120 are formed in the nozzle layer 11 at the same time, e.g., using the same etching step.

After formation of the firing nozzles 22 and dummy nozzles 120, fabrication can proceed substantially as shown and described with respect to FIGS. 6B-6F, albeit with the dummy nozzles 120 replacing the recesses 500.

Because the dummy nozzles 120 during processing steps that would have occurred to form the firing nozzles 22, there is little to no cost impact associated with forming the dummy nozzles 120. In the example shown, the firing nozzles 22 and the dummy nozzles 120 are the same size. In some examples, the firing nozzles 22 and the dummy nozzles 120 can have different sizes.

Particular embodiments have been described. Other embodiments are within the scope of the following claims.

What is claimed is:

1. A method of fluid ejection, the method comprising:

flowing fluid along a feed channel and into each of multiple pumping chambers, in which an actuator is disposed adjacent to each of the pumping chambers; and operating one or more of the actuators to cause fluid to be ejected from the corresponding pumping chamber and through a corresponding nozzle fluidically connected to the pumping chamber, in which operating the one or more actuators causes fluid to flow from the corresponding pumping chambers to the corresponding nozzles via respective descenders, in which operating each actuator causes deflection of a meniscus of fluid in a dummy nozzle defining an opening in a wall of the feed channel, in which the nozzles are arranged along a line, and in which the feed channel is laterally offset from the line.

2. The method of claim 1, in which the dummy nozzle and the nozzles are defined in a substrate, an interior surface of the substrate forming the wall of the feed channel.

3. The method of claim 2, in which the dummy nozzle defines a first opening in the wall of the feed channel and a second opening in an exterior surface of the substrate, wherein the first opening is larger than the second opening.

4. The method of claim 1, in which operating each actuator causes deflection of the meniscus in the second opening of the dummy nozzle, in which the meniscus is a convex meniscus.

5. The method of claim 1, in which deflection of the meniscus at least partially attenuates a change in fluid pressure in the feed channel caused by operation of the one or more of the actuators.

6. The method of claim 1, in which no fluid is ejected from the dummy nozzle responsive to deflection of the meniscus in the dummy nozzle.

7. The method of claim 1, in which operating the one or more actuators causes a first portion of the fluid to be ejected from each nozzle and a second portion of the fluid to flow through an respective outlet passage to a common second feed channel.

8. The method of claim 7, in which operating the one or more actuators causes deflection of a second meniscus of fluid in a second dummy nozzle defining an opening in a wall of the second feed channel.

9. The method of claim 8, in which no fluid is ejected from the second dummy nozzle responsive to deflection of the second meniscus in the second dummy nozzle.

10. A method of fluid ejection, the method comprising:

flowing fluid along a feed channel and into each of multiple pumping chambers, in which an actuator is disposed adjacent to each of the pumping chambers; and operating one or more of the actuators to cause fluid to be ejected from the corresponding pumping chamber and through a corresponding nozzle fluidically connected to the pumping chamber, in which operating each actuator causes deflection of a meniscus of fluid in a dummy nozzle defining an opening in a wall of the feed channel, in which the dummy nozzle and the nozzles are defined in a substrate, an interior surface of the substrate forming the wall of the feed channel, in which the dummy nozzle defines a first opening in the wall of the feed channel and a second opening in an exterior surface of the substrate, wherein the first opening is larger than the second opening, and in which the nozzles are arranged along a line, and in which the feed channel is laterally offset from the line.

* * * * *